(12) United States Patent
Kohlhafer

(10) Patent No.: US 9,390,875 B2
(45) Date of Patent: Jul. 12, 2016

(54) ELECTROMAGNETIC OPPOSING FIELD ACTUATORS

(71) Applicant: Active Signal Technologies, Inc., Linthicum, MD (US)

(72) Inventor: Dennis John Kohlhafer, Ellicott City, MD (US)

(73) Assignee: Active Signal Technologies, Inc., Linthicum, MD (US)

( * ) Notice: Subject to any disclaimer, the term of this patent is extended or adjusted under 35 U.S.C. 154(b) by 0 days.

(21) Appl. No.: 14/290,809

(22) Filed: May 29, 2014

(65) Prior Publication Data

US 2014/0354381 A1    Dec. 4, 2014

Related U.S. Application Data

(60) Provisional application No. 61/828,378, filed on May 29, 2013, provisional application No. 61/927,841, filed on Jan. 15, 2014.

(51) Int. Cl.
*H01H 9/00* (2006.01)
*H01H 50/20* (2006.01)
(Continued)

(52) U.S. Cl.
CPC ............. *H01H 50/20* (2013.01); *H01F 7/02* (2013.01); *H01F 7/066* (2013.01); *H01F 7/122* (2013.01); *H01F 7/13* (2013.01); *H01F 7/1646* (2013.01);
(Continued)

(58) Field of Classification Search
CPC .......................... H01H 7/122; H01H 33/6662
USPC .......................................................... 335/179
See application file for complete search history.

(56) References Cited

U.S. PATENT DOCUMENTS 2,830,151 A * 4/1958 Leslie ................... H01H 33/18
                                                            218/30
3,040,217 A * 6/1962 Conrad ........................ 335/234
(Continued)

OTHER PUBLICATIONS

Huber et al, "The selection of mechanical actuators based on performance indices", Proc. R. Soc. Lond. A, 1997, pp. 2185-2205, vol. 453.
(Continued)

*Primary Examiner* — Shawki S Ismail
*Assistant Examiner* — Lisa Homza
(74) *Attorney, Agent, or Firm* — Alan G. Towner, Esq.; Pietragallo Gordon Alfano Bosick & Raspanti, LLP

(57) ABSTRACT

Electromagnetic actuators capable of generating a symmetrical bidirectional force are disclosed. The electromagnetic actuators include a housing made of a ferromagnetic material and a shaft made of a magnetically inert material movable along an axis within the housing. In one type of actuator, captive permanent magnets are arranged on opposite interior end walls of the housing and an electromagnetic coil is mounted on a central portion of the shaft. The electromagnetic coil is capable of generating a force when energized that causes linear displacement of the shaft in either direction along its axis depending on the direction of current through the electromagnetic coil. In another type of actuator, captive electromagnetic coils are arranged on opposing inner end walls of the housing, and a permanent magnet is mounted on a central portion of the shaft. The electromagnetic coils are capable of generating a force when energized that causes linear displacement of the shaft in either direction along its axis depending on a direction of current through the electromagnetic coils.

23 Claims, 19 Drawing Sheets

(51) Int. Cl.
  *H01H 50/04* (2006.01)
  *H01F 7/02* (2006.01)
  *H01H 50/44* (2006.01)
  *H01F 7/06* (2006.01)
  *H02K 33/18* (2006.01)
  *H01F 7/122* (2006.01)
  *H01F 7/13* (2006.01)
  *H01F 7/16* (2006.01)

(52) U.S. Cl.
  CPC .............. *H01H 50/04* (2013.01); *H01H 50/44* (2013.01); *H02K 33/18* (2013.01)

(56) References Cited

U.S. PATENT DOCUMENTS

| | | | |
|---|---|---|---|
| 4,319,211 A | 3/1982 | Ueda et al. | |
| 4,439,700 A * | 3/1984 | Menzel et al. | 310/13 |
| 4,808,955 A | 2/1989 | Godkin et al. | |
| 4,859,975 A * | 8/1989 | Uetsuhara | 335/230 |
| 4,928,028 A | 5/1990 | Leibovich | |
| 4,945,269 A | 7/1990 | Kamm | |
| 4,994,776 A * | 2/1991 | Juncu | 335/234 |
| 5,010,911 A * | 4/1991 | Grant | 251/65 |
| 5,049,844 A * | 9/1991 | Mustafa | 335/76 |
| 5,107,240 A * | 4/1992 | Tashiro | H01F 36/00 335/216 |
| 5,184,037 A * | 2/1993 | Kobayashi et al. | 310/26 |
| 5,283,234 A * | 2/1994 | Wang | F41B 6/00 188/267 |
| 5,337,030 A | 8/1994 | Mohler | |
| 5,345,206 A * | 9/1994 | Morcos | 335/222 |
| 5,535,853 A | 7/1996 | Skalski | |
| 5,537,829 A * | 7/1996 | Jones | F17C 13/087 335/300 |
| 5,592,905 A | 1/1997 | Born | |
| 5,719,451 A | 2/1998 | Cook et al. | |
| 5,860,306 A | 1/1999 | Daehn et al. | |
| 6,147,422 A | 11/2000 | Delson et al. | |
| 6,532,919 B2 | 3/2003 | Curtis et al. | |
| 6,552,450 B2 | 4/2003 | Harty et al. | |
| 6,870,285 B2 | 3/2005 | Godkin | |
| 6,876,284 B2 * | 4/2005 | Wright et al. | 335/229 |
| 7,288,861 B1 * | 10/2007 | Willard | H02K 41/0356 310/14 |
| 7,352,268 B2 | 4/2008 | Wright et al. | |
| 7,417,387 B2 | 8/2008 | Liu | |
| 7,710,226 B2 | 5/2010 | Nelson | |
| 7,768,157 B2 * | 8/2010 | Takeuchi | H02K 21/04 310/12.21 |
| 8,085,119 B2 | 12/2011 | Corcoran et al. | |
| 8,134,436 B2 | 3/2012 | Yasoshima | |
| 8,188,821 B2 | 5/2012 | Nelson | |
| 8,274,348 B2 | 9/2012 | Kolb et al. | |
| 8,324,763 B2 | 12/2012 | Gosvener | |
| 8,344,560 B2 | 1/2013 | Gosvener | |
| 8,387,945 B2 | 3/2013 | Cope | |
| 8,422,173 B2 | 4/2013 | Yeakley et al. | |
| 2002/0117904 A1 | 8/2002 | Godkin | |
| 2004/0093718 A1 | 5/2004 | Takeuchi et al. | |
| 2005/0052265 A1 * | 3/2005 | Vladimirescu et al. | 335/229 |
| 2007/0273461 A1 | 11/2007 | Kang et al. | |
| 2008/0164964 A1 | 7/2008 | Nelson | |
| 2009/0251257 A1 * | 10/2009 | Stelzer | H01F 41/098 335/300 |
| 2009/0251258 A1 * | 10/2009 | Rhinefrank | F03B 13/20 335/306 |
| 2011/0210809 A1 | 9/2011 | Nelson | |
| 2011/0248804 A1 | 10/2011 | Wygnanski | |
| 2012/0007448 A1 | 1/2012 | Gosvener | |
| 2013/0328650 A1 | 12/2013 | Robertson | |

OTHER PUBLICATIONS

Woodward Product Catalog, cover page through p. 27, 2004.
Cedrat Technologies, "Bi-state Linear Moving Magnet BLMM", 2009.
Woodward, "Woodward Engine Solenoids", Dec. 5, 2012.

\* cited by examiner

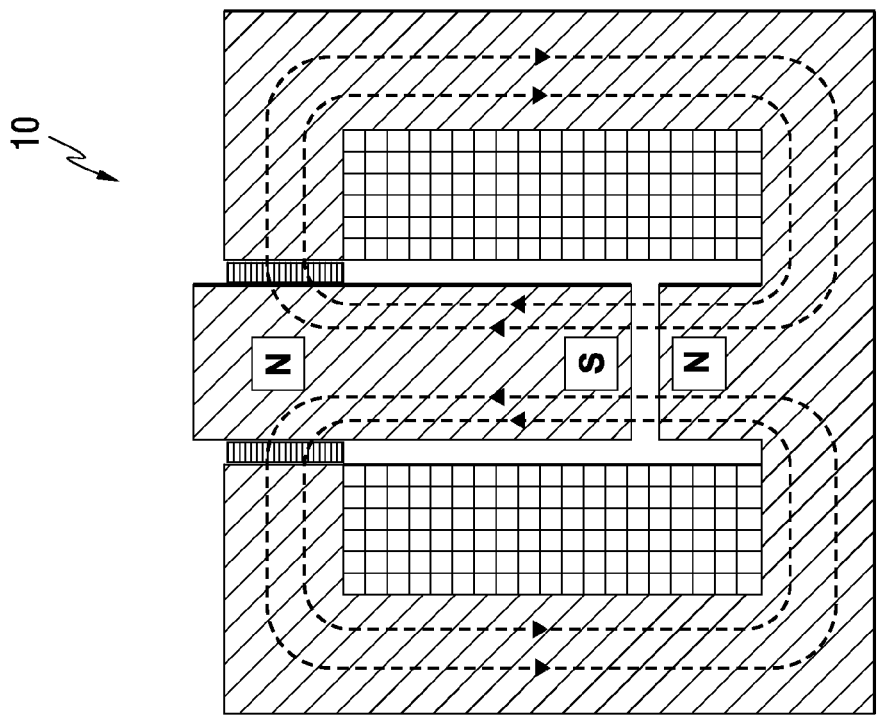
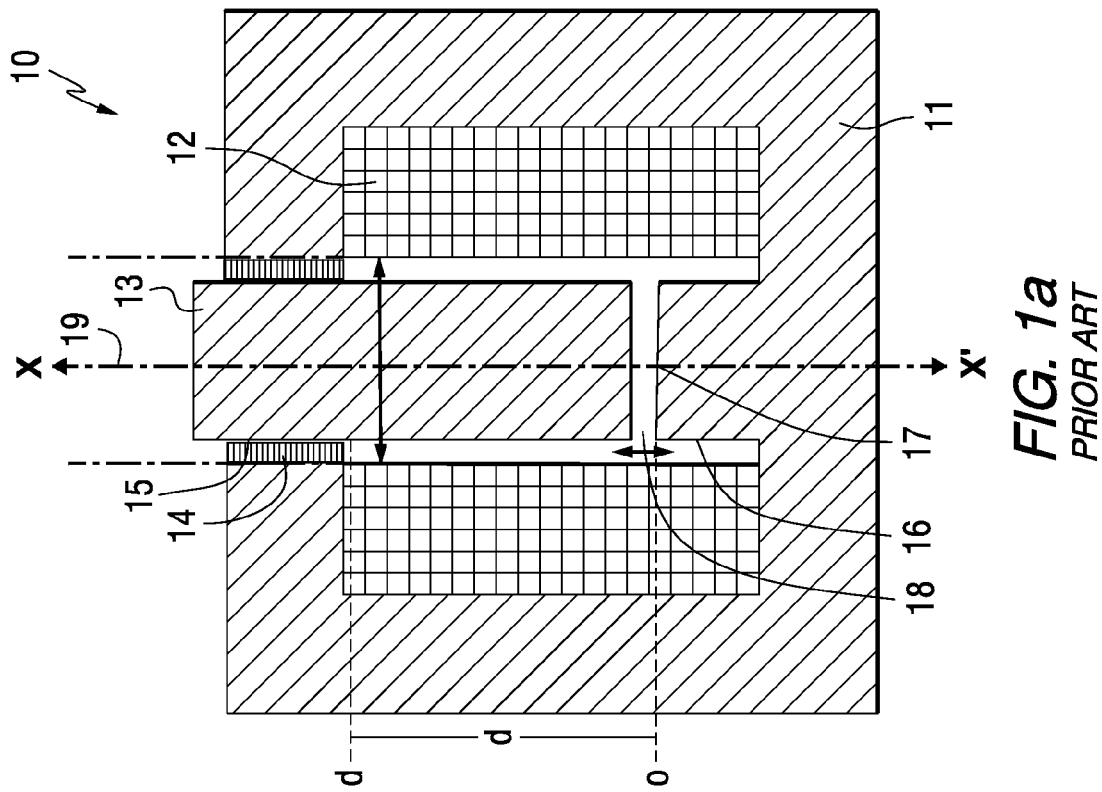
FIG. 1b
PRIOR ART
FIG. 1a
PRIOR ART

ELECTROMAGNETIC OPPOSING FIELD ACTUATORS

CROSS-REFERENCE TO RELATED APPLICATIONS

The present application claims priority to U.S. provisional patent application 61/927,841, filed on Jan. 15, 2014, and U.S. provisional patent application 61/828,378, filed on May 29, 2013, which are hereby incorporated by reference in their entirety.

FIELD OF THE INVENTION

The present invention relates to electromagnetic actuators, and more particularly relates to electromagnetic opposing field actuators that exhibit bidirectional action with a uniform force across a displacement distance, and a linearly proportional force to an applied current.

BACKGROUND INFORMATION

Linear actuation is very important in fields ranging from transportation, to controls, robotics and weapon systems. When considering the broadest range of linear actuators available to a mechanical design engineer, it is apparent that hydraulics and pneumatics offer unparalleled stress (defined as maximum force divided by actuator cross sectional area) and strain (extension divided by initial actuator length) explaining their dominance in power machinery. However, these are typically noisy and require heavy and bulky pressure sources such as motor driven pumps, reservoirs, accumulators, manifolds, complex servo valves, cooling equipment and plumbing. In addition, the actuation frequency of hydraulics and pneumatics is limited by valve dynamics and mass flow properties of liquids and gases.

Simple solid state actuation devices such as magnetostrictors, piezoelectrics and electrostrictors offer outstanding force capability (stress) but their strain output is so limited that it becomes extremely difficult to realize macroscopic strains in practical devices. Even with state of the art high strain piezoelectric single crystal materials originally developed to boost the output of low frequency sonar transducers the maximum available strain is <0.1% at high frequency >10 Hz and ~1% at very low frequencies <10 Hz. Practical real world strains to produce useful macro-scale work can therefore only be obtained with huge solid state devices or motion amplification mechanisms that introduce phase lag as well as mechanical energy losses that generally appear as backlash and hysteresis.

Solenoids and moving coil actuators meet a range of meso- and macro-scale actuation requirements where low output force (low stress) actuation is needed at practically useful strains greater than $10^{-3}$. However, the performance of these devices does not extend into higher stress capabilities. Solenoids typically exhibit inertially limited frequency response and asymmetric nonlinear force versus displacement necessitating the use of a spring for bidirectional motion. Moving coils only develop modest, non-linear forces over a limited displacement range. In addition, these devices produce highly non-uniform forces over their displacement ranges because their construction is constrained by the need for very high local magnetic fields.

To achieve high performance in conventional magnetic actuators it is necessary to use high magnetic permeability materials, precisely aligned magnetic elements and the smallest possible air gaps between them. Typical solenoids require a tight air gap and need a high permeability magnetic material in the magnetic circuit. Similarly, conventional moving coil devices require a magnetic circuit arrangement and narrow gaps to generate reasonable displacement of the moving element. In both cases, the output force versus distance traveled by the moving element in the devices exhibits a nonlinear force versus distance behavior and consequent limitation on the range of useful displacement they can achieve. Linear motors extend the displacement available from an electromagnetic device by effectively stretching out the circumference of a rotational stepper motor. While this extends the range of motion, this type of device also relies on close spacing of the permanent and electro magnetic elements to provide enough magnetic field intensity to drive the moving element.

A typical conventional moving coil device requires a structure to both support the coil and connect it to the load, but it has to move through the most intense portion of the field. Accordingly, if the coil support consumes space that would otherwise be occupied by coil windings or increases the size of gap in the magnetic circuit the capabilities of the device are compromised. While the empty spaces, or voids, in moving coils are not configured in precisely the same way as those in solenoids, in both cases they present significant limitations on device performance. The precise thickness of these gaps is critical to the force and axial displacement obtainable from both because high uniform field strength must be maintained constantly across the narrowest practical gap. The conventional solenoid features two dissimilar types of empty spaces that break the magnetic circuit in the active magnetic train: a fixed width annular motion clearance gap; and an axial separation of variable length. The former causes a fixed amount of permeability degradation irrespective of displacement between moving and stationary parts, while the permeability decrement caused by the latter becomes higher with increased displacement and hence greater separation between moving and stationary parts. The moving coil has two parallel fixed width annular motion clearance gaps interrupting the magnetic circuit through the active magnetic train. While the widths of these two gaps orthogonal to the motion axis are small and fixed, the vertical (axial) position of the coil with respect to the adjacent inward facing planes of the yoke surrounding the opening changes as the coil travels vertically axially to produce force and displacement. Thus the path carrying magnetic flux between the coil and the yoke lengthens as the coil moves further away from its rest (no current) position centered vertically between the faces of the yoke surrounding the opening. Accordingly, the effective size of the gap is close to invariant for a relatively short vertical length while the coil remains in the swept volume between said yoke faces but then increases with coil travel in much the same way as axial separation in a solenoid.

While the above shortcomings of solenoids and moving coils have to be recognized, their direct linear electrical actuation (DLEA) remains very attractive because it represents direct conversion of electric current to mechanical force and motion without intermediary mechanisms (like gears for rotating motors) or media (such as fluids and gases in the case of hydraulics and pneumatics). However, such prior art DLEA devices present a control challenge when accurate forces and positions are needed with minimal overshoot and correction.

To respond rapidly to a commanded set point of force, acceleration, velocity or position, the control electronics need to have a-priori data or equations describing the force vs. distance and force vs. drive current (or voltage) of the device. If either or both relationships are nonlinear and/or vary with frequency then complex compensation, or linearization, circuits must be employed to allow a commanded, or desired, output to be translated into a practical corrected electrical drive signal to the device. Alternatively, with a digital control system, the device must be comprehensively characterized and equations or data describing the nonlinearity preloaded into the control routine. Two further control difficulties arise with the solenoid. First, its intrinsic unidirectional force and hence return-spring mode of operation for reverse motion confers an entirely different force-distance profile and force-current (or voltage) profile in either direction. As described above, this must be addressed mechanically, compensated electronically or programmed-out digitally. Secondly, the ascending force versus current (or voltage) path and the ascending force versus distance path will differ from the corresponding reverse (or descending) paths giving rise to hysteresis (an effect that also varies with frequency) and hence ambiguity in determining the instantaneous state of the system. For example a displacement feedback sensor can be used to determine force in a well-characterized and calibrated system but this inferred force will be quite different depending on whether the device is in ascending or descending mode.

Electromechanical (EM) actuators have become ubiquitous in almost every field of engineering, transportation, production, and consumer products from magnetic tape drives, industrial process lines, and robotics to aircraft and missile flight controls. Even though the EM actuator field is very mature, well understood, and devices have been successfully developed to address a wide range of applications, in almost all cases the underlying technology is based on the simple principles, and hence the limitations, of traditional solenoids and moving coils. A case in point is the limited amount of throw, or displacement, which can be produced by either type of device because both rely on close proximity of ferromagnetic elements, permanent magnets and/or current-carrying coils to focus the magnetic field within a narrow region. For many applications this has led to the use of electric motors with a variety of ancillary mechanisms (e.g., ball-screws, reduction gears and planetary gears, etc.) to realize greater displacement. The alternative has been to achieve long travel linear motion by employing a linearized stepper motor configuration with extended lengths of extremely small and tightly spaced coils and/or magnets. Both options result in increased electrical and control complexity as well as greater size and weight. The alternatives utilizing ancillary gears or ball-screws also present a finite risk of jamming failure as compared to the neutral, non-catastrophic graceful failure modes that can be invoked with hydraulic actuation systems, which is critical for high-reliability applications such as aircraft flight controls.

SUMMARY OF THE INVENTION

The present invention provides direct linear electrical actuation devices incorporating a novel set of design and construction principles. The electromagnetic configurations realized through these principles are implemented with limited numbers of moving parts and essentially no ancillary equipment aside from externally supplied electrical power. The devices output inherently long (high strain) bidirectional stroke at high uniform force for a given applied current. They also provide inherently safe non-jamming failure modes wherein the output shaft hangs free when power to the device is cut.

The present electromagnetic opposing field actuators provide several advantages including high force, fully bidirectional action, high speed (high frequency) response, greater length over which linear force versus displacement can be realized, substantially linear scaling of force with current over a very wide dynamic range extending beyond 3 decades, low power dissipation and low magnetic field losses. The present actuators may generate a null or cancellation field extending through a working gap, or actuator displacement range, to the magnetic return circuit, thereby decreasing magnetic field return losses. The field arrangement results in a larger working air gap and a very linear device with exceptionally high invariant forces over long working distances.

An aspect of the present invention is to provide an electromagnetic actuator capable of generating a symmetrical bidirectional force comprising: a housing comprising a ferromagnetic material, wherein the housing has a first end wall, a second end wall opposite the first end wall, and a side wall interconnecting the first and second end walls; a first captive permanent magnet arranged on the first end wall and having an inward facing pole; a second captive permanent magnet arranged on the second end wall and having an inward facing pole arranged to repel the inward facing pole of the first permanent magnet causing the first and second permanent magnets to have opposing magnetic fields; a shaft comprising a magnetically inert material, wherein the shaft is movable along a longitudinal axis extending between the first and second end walls, and comprises a central portion interposed between the first and second permanent magnets; and an electromagnetic coil arranged on the central portion of the shaft, wherein the electromagnetic coil is capable of generating a force when energized that causes linear displacement of the shaft in either direction along the longitudinal axis depending on a direction of current through the electromagnetic coil.

Another aspect of the present invention is to provide an electromagnetic actuator capable of generating a symmetrical bidirectional force comprising: a housing comprising a ferromagnetic material, wherein the housing has a first end wall, a second end wall opposite the first end wall, and a side wall interconnecting the first and second end walls; a first captive electromagnetic coil arranged on the first end wall; a second captive electromagnetic coil arranged on the second end wall, wherein the first and second electromagnetic coils have opposing electromagnetic fields when energized; a shaft comprising a magnetically inert material, wherein the shaft is movable along a longitudinal axis extending between the first and second end walls, and comprises a central portion interposed between the first and second electromagnetic coils; and a permanent magnet arranged on the central portion of the shaft, wherein the first and second electromagnetic coils are capable of generating a force when energized that causes a linear displacement of the shaft in either direction along the longitudinal axis depending on a direction of current through the first and second electromagnetic coils.

These and other aspects of the present invention will be more apparent from the following description.

BRIEF DESCRIPTION OF THE DRAWINGS

FIGS. 1a and 1b are partially schematic side sectional views of a conventional solenoid.

DETAILED DESCRIPTION

Figure 2:
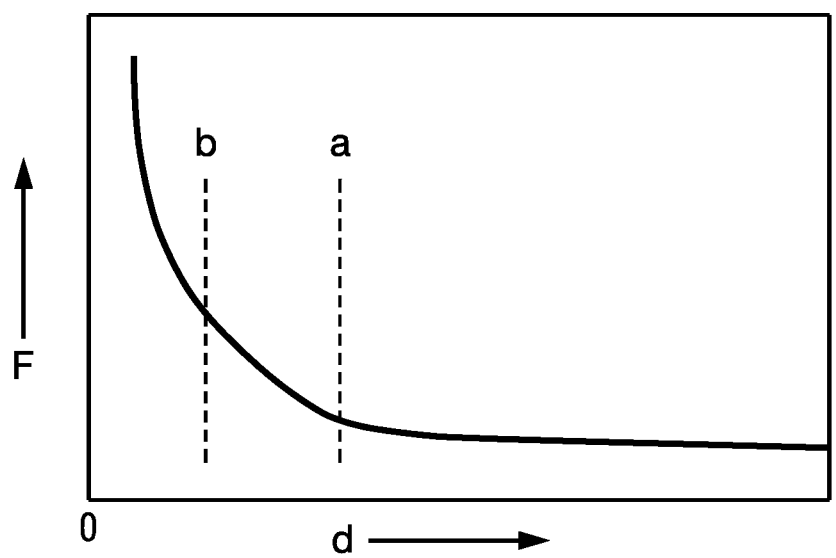
FIG. 2 is a typical force versus distance curve for the conventional solenoid shown in FIGS. 1a and 1b.

The present electromechanical devices may be driven by a magnetic field that ultimately derives from permanent magnets and/or electromagnetic coils, which are therefore termed the primary field generating components. In addition to primary field generating components, the electromechanical devices may employ un-poled ferromagnetic components that independently present negligible magnetic field unless such a magnetic field is induced in the component while in close proximity to permanent magnets or energized electromagnetic coils.

The spatial location and magnitude of the magnetic field in the direction of a desired output from the electromechanical device is the net result of magnetic interaction of components in an active magnetic train. The active magnetic train comprises permanent magnets, electromagnetic coils and induced magnetic components acting in concert. The active magnetic train typically does not include ancillary mechanical components (e.g., linkages, bushings, guides, levers, etc.), electrical components (e.g., leads, connectors, etc.), and/or structural components (e.g., reinforcing members, etc.). Components such as the housing, tuning magnetic field elements, and/or magnetic return circuit elements external to the active magnetic train are not significant sources of the driving magnetic field and instead support and enhance the output produced by the active magnetic train.

FIGS. 1a and 1b illustrate a typical configuration of a conventional solenoid including the arrangement of various mechanical and electromagnetic components. Solenoids are widely available and inexpensive electromagnetic devices that typically use a fixed electromagnetic coil to produce an electromagnetic field to draw-in a ferromagnetic rod, slug or plunger that creates an output of force and/or motion. The conventional solenoid 10 comprises a ferromagnetic cylindrical housing 11, an electromagnetic coaxial coil 12 arranged in the ferromagnetic cylindrical housing 11, and a ferromagnetic plunger 13 substantially surrounded by the electromagnetic coaxial coil 12 and movable along a longitudinal axis 19 (X-X').

As shown in FIG. 1*a*, the ferromagnetic cylindrical housing 11 may include a nonmagnetic guide (e.g., a nonmagnetic sleeve or bushing) 14 for guiding the ferromagnetic plunger 13. An annular clearance gap 15 may exist between the nonmagnetic guide 14 and the ferromagnetic plunger 13 and extend parallel to the longitudinal axis 19 of motion of the ferromagnetic plunger 13 as described in greater detail below. The ferromagnetic cylindrical housing may also include a ferromagnetic return portion 16 for attracting the ferromagnetic plunger 13 to a latching position 17. An axial separation gap 18 may exist between the ferromagnetic plunger 13 and the ferromagnetic return portion 16 when the ferromagnetic plunger 13 is not latched to the ferromagnetic return portion 16 as described in greater detail below.

The active magnetic train of the conventional solenoid 10 comprises the ferromagnetic plunger 13, the electromagnetic coaxial coil 12 surrounding the ferromagnetic plunger 13, the ferromagnetic cylindrical housing 11 including the ferromagnetic return portion 16 surrounding the electromagnetic coaxial coil 12, and the nonmagnetic guide 14 for guiding the ferromagnetic plunger 13.

FIG. 1*b* illustrates the flux paths of the conventional solenoid of FIG. 1*a* with magnetic field lines extending upward from the ferromagnetic return portion 16 across the axial separation gap 18 into and through the ferromagnetic plunger 13 into the cylindrical housing 11 and back to the ferromagnetic return portion 16 in a continuous loop.

The ferromagnetic cylindrical housing 11 and the ferromagnetic plunger 13 comprise a non-poled ferromagnetic materials. Since the ferromagnetic cylindrical housing 11 and the ferromagnetic plunger 13 participate directly in the active magnetic train, they must acquire induced magnetic characteristics from an intense region of a magnetic field produced by primary magnetic field generating components. Accordingly, the non-poled ferromagnetic plunger 13 must be in close proximity to very high local magnetic fields. The electromagnetic coaxial coil 12 constitutes the only primary magnetic field generating component in the device. Hence the ferromagnetic return portion 16 and cylindrical housing 11 must surround the electromagnetic coaxial coil 12 on both its inner and outer surfaces in order to complete the magnetic circuit with minimum air gaps to ensure the effective passage of magnetic flux.

When the electromagnetic coaxial coil 12 is energized, magnetic field lines are produced that loop and pass through the ferromagnetic plunger 13, the ferromagnetic cylindrical housing 11 including the ferromagnetic return portion 16 surrounding the electromagnetic coaxial coil 12, and the nonmagnetic guide 14. The induced magnetic field of the ferromagnetic plunger 13 causes it to be attracted towards the ferromagnetic return portion 16 and move axially into the device. In certain cases, the ferromagnetic plunger 13 does not contact the ferromagnetic return portion 16 and remains magnetically isolated from the ferromagnetic return portion 16. In certain cases, the ferromagnetic plunger 13 may travel to a position adjacent the inner face of the ferromagnetic return portion 16 to assume a latching position 17. In certain cases, the ferromagnetic plunger 13 may bottom out in the device and assume an extreme latching position 17 where the ferromagnetic plunger 13 actually contacts the ferromagnetic return portion 16.

Adopting a convention that surfaces with field lines vectoring out acquire a north (N) magnetic polarity, while those surfaces with field lines entering adopt south (S) polarity, the inner surface of the ferromagnetic plunger 13 is denoted as a south pole (S) while the opposing inner surface of the ferromagnetic return portion 16 is denoted as a north pole (N). The plunger 13 and return 16 thus acquire opposite polarity and are attracted to each other.

Optimum force and efficiency of electromechanical devices is achieved with a closed magnetic circuit that is configured and arranged to contain and channel substantially all of the magnetic flux from electromagnets and permanent magnets within a high permeability contiguous magnetic circuit, which may be referred to as a closed loop.

Conventional solenoid configurations such as illustrated in FIGS. 1*a* and 1*b* comprise two effective openings, voids or air gaps having a high reluctance in the magnetic circuit of the active magnetic train. The degree of reluctance (i.e., magnetic resistance) is determined by the size of these two air gaps because magnetic flux can only close the loop by traversing these openings, voids or air gaps. The reluctance determines the magnetic flux in the magnetic circuit for a given current through the electromagnetic coaxial coil 12, while the force output from the solenoid is proportional to the square of that magnetic flux.

The first opening, void or air gap having a high reluctance is the annular clearance gap 15 between the ferromagnetic plunger 13 and the nonmagnetic guide 14. The annular clearance gap 15 between the nonmagnetic guide 14 and the ferromagnetic plunger 13 is a thin walled cylinder of air of substantially constant wall thickness that surrounds the ferromagnetic plunger 13 and extends parallel to the longitudinal axis 19 of motion of the ferromagnetic plunger 13. In certain embodiments, the annular clearance gap 15 extends parallel to the longitudinal axis 19 of motion of the ferromagnetic plunger 13 along the length of the electromagnetic coaxial coil 12 to the top surface of the ferromagnetic return portion 16. The presence of annular clearance gap 15 allows free axial motion of ferromagnetic plunger 13 through the device in order to impart force and displacement to an external load.

The annular clearance gap 15 that exists between the nonmagnetic guide 14 and the ferromagnetic plunger 13 must be large enough to satisfy the mechanical performance characteristics (e.g., force, motion, and wear resistance) required of the device which in turn is dictated by the mass and diameter properties of the ferromagnetic plunger 13 needed to generate practically useful forces and displacements, and the tribological properties of the nonmagnetic guide 14, which must be selected for mechanical rather than magnetic properties. The nonmagnetic guide 14 (e.g., sleeve or bushing) serves as a sliding contact surface lining during motion of the ferromagnetic plunger 13 along the longitudinal axis 19.

While annular clearance gap 15 provides the dimensional clearance to allow unimpeded axial motion of the ferromagnetic plunger 13, the annular clearance gap 15 also limits magnetic flux through the ferromagnetic plunger 13, thereby decreasing efficiency with which electric current is transduced to force output. Accordingly, the annular clearance gap 15 that exists between the nonmagnetic guide 14 and the ferromagnetic plunger 13 must also be small enough to maintain a closed magnetic circuit between the ferromagnetic cylindrical housing 11 and the ferromagnetic plunger 13, which are key components of the active magnetic train.

While the annular clearance gap 15 is set to be as narrow or thin as possible, the annular clearance gap 15 nevertheless significantly reduces the magnetic flux that can be contained within the magnetic circuit because the relative permeability of air is approximately 1 while the permeability of most ferromagnetic materials typically used in electromagnetic transducers is generally in the range of from about one hundred to several thousand. The output force and efficiency is therefore highly dependent on achieving the narrowest possible annular clearance gap 15.

The second opening, void or air gap having a high reluctance is the axial separation gap 18 that lies between the ferromagnetic plunger 13 and the ferromagnetic return portion 16 when the ferromagnetic plunger 13 is not latched to the ferromagnetic return portion 16. The axial separation gap 18 extends through the operating travel volume between opposing inner surfaces of the ferromagnetic plunger 13 and the ferromagnetic return portion 16.

As with the annular clearance gap 15, the axial separation gap 18 is filled with low permeability air and occupies a critical region in the device containing a high concentration of magnetic flux lines. Hence the magnitude of this separation is a major determinant of magnetic field strength and force output because the magnetic flux has to traverse this low permeability medium in order to complete the magnetic circuit.

As discussed above, the induced magnetic field in the ferromagnetic plunger 13 for any given current direction through electromagnetic coaxial coil 12 results in magnetic attraction of the ferromagnetic plunger 13 towards the ferromagnetic return portion 16. At the widest separation between the ferromagnetic plunger 13 and the ferromagnetic return portion 16, the magnetic field and output force are weak but these increase sharply when the separation becomes very small and magnetic flux lines can cross the air gap effectively.

FIG. 2 illustrates a typical force versus distance curve for the conventional solenoid shown in FIGS. 1a and 1b. As shown in FIG. 2, forces produced by the conventional solenoid 10 at displacements greater than "a" are generally too low for most practical applications, while forces produced at displacements less than "b" are generally too high for most practical applications. Therefore, unless the solenoid 10 is operated over the very limited displacement range between "a" and "b," the force from the device will vary significantly with distance and the variation will be nonlinear.

FIG. 2 also shows the typical asymmetric forces produced when the electromagnetic coaxial coil 12 is energized and induces a magnetic field in the ferromagnetic plunger 13 that draws it towards the ferromagnetic return portion 16. The profile is clearly nonlinear and therefore while the ferromagnetic plunger 13 may move over a practical distance suitable for many applications, useful high forces and mechanical work are only realized in a very narrow range as the ferromagnetic plunger 13 approaches its latching position 17 adjacent the ferromagnetic return portion 16. Accordingly, conventional solenoids are essentially unidirectional with respect to doing useful work because the high forces that are produced are only available for latching in one direction at one end of travel of the ferromagnetic plunger 13.

Figure 3:
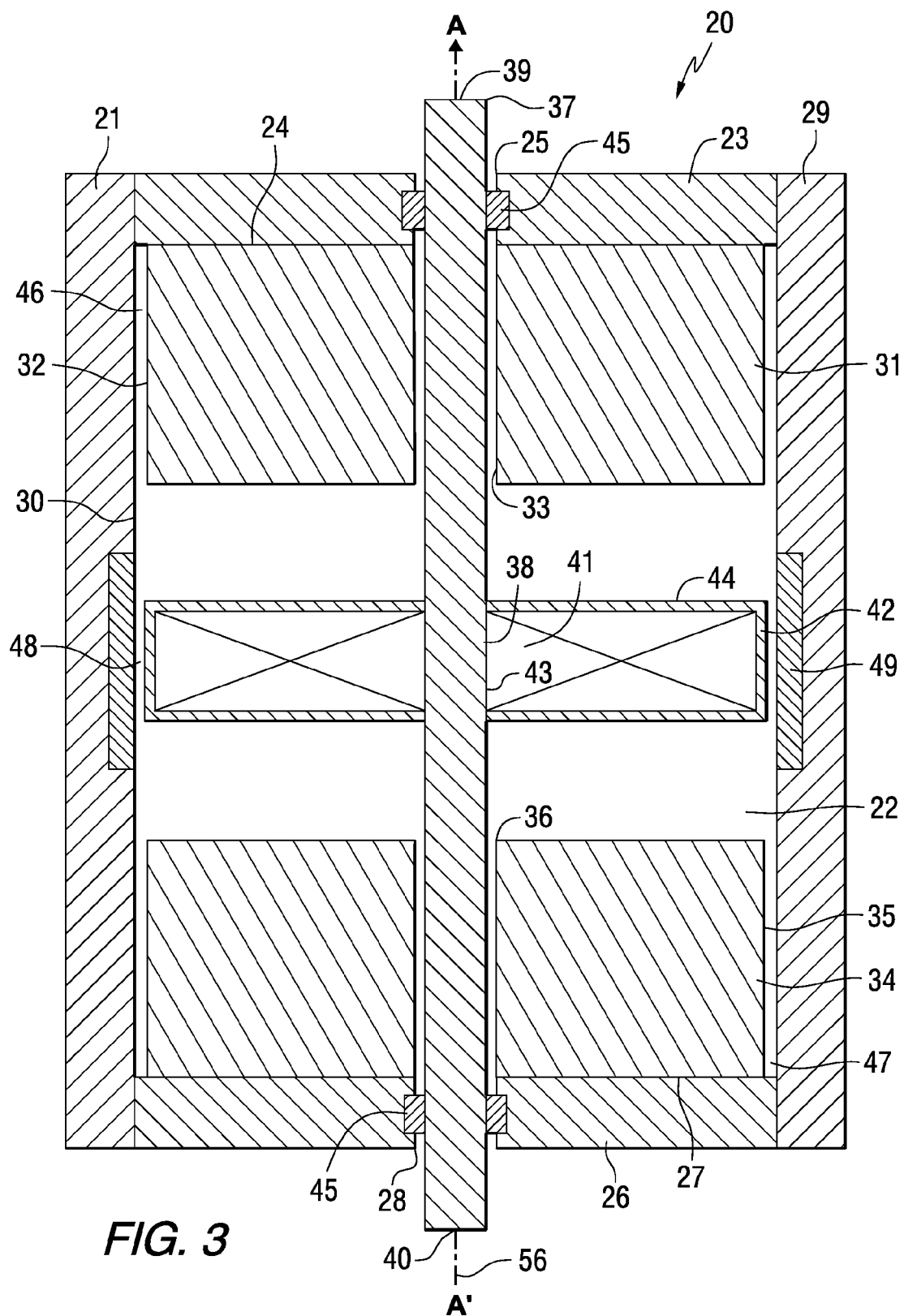
FIG. 3 is a partially schematic side sectional view of an electromagnetic opposing field actuator comprising two stationary permanent magnets and a movable electromagnetic coil in accordance with an embodiment of the present invention.

FIG. 3 illustrates an electromagnetic opposing field actuator 20 comprising a housing 21, two stationary permanent magnets 31, 34, a shaft 37, a movable electromagnetic coil 41, and an optional magnetic field tuning element 49 in accordance with an embodiment of the present invention. As shown in FIG. 3, the housing 21 has a first end wall 23, a second end wall 26 opposite the first end wall 23, and a side wall 29 interconnecting the first and second end walls 23, 26. The first end wall 23 has an inner surface 24 and a first central opening 25. The second end wall 26 has an inner surface 27 and a second central opening 28. The side wall 29 has an inner surface 30. In certain embodiments, the side wall 29 has a substantially cylindrical shape. The first end wall 23, the second end wall 26, and the side wall 29 of the housing 21 define a central cavity 22.

The housing 21 comprises a ferromagnetic material. In certain embodiments, the ferromagnetic material comprises a soft ferromagnetic material having a relative permeability of at least $750\mu_r$. For example, the ferromagnetic material may comprise a 400 series stainless steel, a 416 stainless steel, a mild steel, a soft iron, an iron silicon alloy, an iron-cobalt-vanadium alloy, or combinations thereof. The use of such different ferromagnetic material may confer the desired combination of properties such as structural integrity, corrosion resistance and magnetic flux carrying capacity, which renders the housing structurally sturdy, corrosion resistant and sufficiently magnetically conductive. Since the housing 21 comprises a ferromagnetic material, the housing is capable of providing a substantially contiguous ferromagnetic enclosure that constitutes a magnetic field return path for the primary field generating components (e.g., the first and second permanent magnets 31, 34, and the electromagnetic coil 41).

Although the housing of the present invention does not require use of an especially high permeability magnetic material (e.g., soft iron and/or silicon steel), using a higher permeability magnetic material may result in a thinner housing having a reduced weight and size. In certain embodiments, a reinforced outer housing constructed from a strong, light weight material (e.g., a carbon fiber-epoxy composite, a fiberglass-epoxy composite, or other reinforced plastic material) may be used to provide enhanced structural integrity to the housing, which may be beneficial when employing soft iron and/or silicon steel as the ferromagnetic material of the housing.

It should be mentioned that there is significant latitude in the specific ferromagnetic materials used in the construction of the housing 21. While wishing not to be bound by any particular theory, this flexibility in the selection of ferromagnetic materials may be attributable, at least in part, to the magnetic permeability requirements of the housing 21, which has a cancellation field (which will be discussed in greater detail below) that exists in the central cavity 22 thereof, being far less demanding than the magnetic permeability requirements associated with the housings of some conventional electromechanical devices that require a very high magnetic permeability in the return circuit in order to achieve even a moderate magnetic flux loop and hence usable output force. Therefore, unlike conventional devices, the electromagnetic actuator of the present invention is relatively insensitive to the permeability of the housing material thereby allowing the use of magnetic materials with lower permeability without incurring significant losses in the magnetic flux field and output force.

As shown in FIG. 3, the first permanent magnet 31 is arranged on (e.g., mounted on, in contact with, integrated into, or embedded within) the inner surface 24 of the first end wall 23. The first permanent magnet 31 has an outer surface 32, a first central hole 33, and an inward facing pole. In certain embodiments, a first gap or zone 46 comprising a non-ferromagnetic material (e.g., air) is interposed between the outer surface 32 of the first permanent magnet 31 and the inner surface 30 of the side wall 29. In certain embodiments, the first permanent magnet 31 comprises an assembly of permanent magnets.

As shown in FIG. 3, the second permanent magnet 34 is arranged on (e.g., mounted on, in contact with, integrated into, or embedded within) the inner surface 27 of the second end wall 26. The second permanent magnet 34 has an outer surface 35, a second central hole 36, and an inward facing pole arranged to repel the inward facing pole of the first permanent magnet 31. Accordingly, the first and second permanent magnets 31, 34 have opposing magnetic fields extending into the central cavity 22. In certain embodiments, a second gap or zone 47 comprising a non-ferromagnetic material (e.g., air) is interposed between the outer surface 35 of the second permanent magnet 34 and the inner surface 30 of the side wall 29. In certain embodiments, the second permanent magnet 34 comprises an assembly of permanent magnets.

Figure 4:
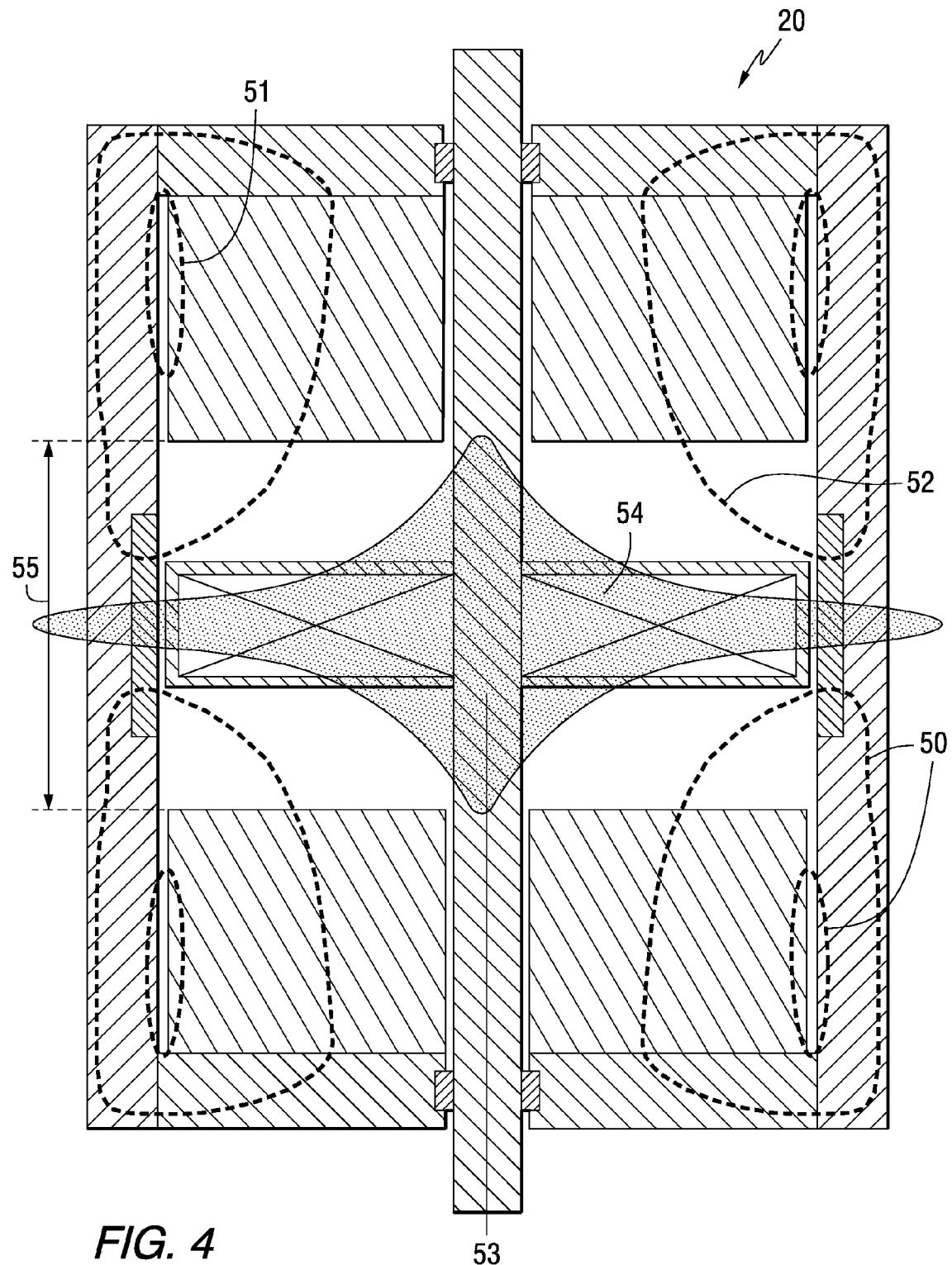
FIG. 4 is a partially schematic side sectional view illustrating primary lines of magnetic flux and a cancellation field exhibited by the electromagnetic opposing field actuator of FIG. 3.

The two field magnets can be arranged on either side of the actuation coil so that their fields in the working gap are in opposition. In other words they can be arranged so that the north poles are facing each other or the south poles are facing each other. Referring to FIG. 4, this creates an opposing field or cancellation field 54. Magnetic field models of this arrangement show that a central region between the magnets is primarily occupied by a null field defined as a field of substantially reduced magnetic field intensity.

The first and second permanent magnets 31, 34 having opposing magnetic fields are separated by a distance sufficient to allow the shaft 37 and the electromagnetic coil 41 arranged on the central portion 38 of the shaft 37 to traverse the entire actuation distance 55 of the bidirectional linear axial displacement. As compared to conventional solenoids or electromagnetic actuators, the electromagnetic actuator of the present invention is compatible with comparatively large gaps between the first and second permanent magnets 31, 34 and is relatively insensitive to minor magnet misalignment.

In certain embodiments, the first permanent magnet 31 and/or the second permanent magnet 34 comprise a permanent magnet or an assembly of permanent magnets having a maximum energy product ($BH_{max}$) of from 16 to greater than 55 megaGauss-Oersteds (MGOe), including from 35 to 48 MGOe. For example, the first permanent magnet 31 and/or the second permanent magnet 34 may comprise a neodymium-iron-boron magnet, an assembly of neodymium-iron-boron magnets, a samarium-cobalt alloy magnet, an assembly of samarium-cobalt alloy magnets, or combinations thereof. In certain embodiments, samarium cobalt magnets may be used for operation at high temperatures, but their use may result in a lower total force because of their lower energy density and/or permeability.

As shown in FIG. 3, the shaft 37 is movable along the longitudinal axis 56 (A-A'), which is central to and parallel with the side wall 29 and perpendicular to the first and second end walls 23, 26. The shaft 37 has a central portion 38 interposed between the first and second permanent magnets 31, 34. The central portion 38 of the shaft 37 is arranged in the central cavity 22 of the housing 21. The shaft 37 may also have a first end portion 39 extending through both the first central hole 33 of the first permanent magnet 31 and the first central opening 25 of the first end wall 23 of the housing 21. The shaft 37 may also have a second end portion 40 extending through both the second central hole 36 of the second permanent magnet 34 and the second central opening 28 of the second end wall 26 of the housing 21. A relatively thin contact separation (bushing, not shown) may exist between the shaft 37 and the first and second end walls 23, 26 and/or the first and second permanent magnets 31, 34 to prevent contact during motion.

Although the first central hole 33, the first central opening 25, the second central hole 36, and the second central opening 28 are magnetically equivalent to air, they only have to be large enough to accommodate a relatively thin shaft 37. Therefore, such holes or openings cause only minimal, if any, disruption to the magnetic return circuit or the operational field, especially since the magnetic flux in this vicinity of the central cavity is dominated by a null field zone. Additionally, the area of the shaft opening can readily skirt around such small, effectively air-filled holes or openings with minimal course deviation, change in flux concentration, and/or adverse impact on the overall flux carried by or passing through the housing is also an area of null or reduced magnetic field within the housing material.

The movable shaft 37 is capable of undergoing bidirectional linear axial displacement along the longitudinal axis 56 between the first and second permanent magnets 31, 34. The bidirectional linear axial displacement of the movable shaft 37 along the longitudinal axis 56 defines an actuation distance 55. The longitudinal axis 56 may be an axis of symmetry or lie in a plane of symmetry of the housing 21. In certain embodiments, the longitudinal axis 56 may be an axis of circular symmetry extending axially through a cylindrical housing.

The shaft 37 comprises a magnetically inert material. As used herein, the term "magnetically inert material" means a non-ferromagnetic, non-electrically-conducting material. In certain instances, the magnetically inert material may be locally electrically conductive, i.e., segments of a component, such as the shaft 37, may comprise electrically conductive portions separated by insulating portions so as to reduce or eliminate eddy current generation.

The shaft 37 comprises a magnetically inert material (i.e., a non-ferromagnetic, non-electrically-conducting material) because a shaft constructed from a ferromagnetic material would provide a magnetic shunt path, reducing the strength of the magnetic field by interfering with the cancellation field created in the displacement gap of the device. Furthermore, while a shaft constructed from an electrically-conductive, non-ferrous material would create eddy currents in the shaft creating heat and acting as a damper on the motion of the shaft during movement through the central holes 33, 36 of the permanent magnets 31, 34.

Since the shaft 37 comprises a magnetically inert material, the shaft 37 has essentially no role in the magnetic circuit and thus does not constitute a component of the active magnetic train. As discussed in greater detail below, the electromagnetic coil 41 is affixed to or arranged on (e.g., mounted on) the central portion 38 of the shaft 37. Accordingly, the shaft 37 is designed and configured to meet desired mechanical attributes and physical properties for supporting the electromagnetic coil 41 and withstanding any physical and mechanical stresses imposed thereon by the transfer of force and motion generated by the electromagnetic coil. The size and/or diameter of the shaft 37 can be minimized to conserve space, reduce mass, and/or reduce disruption to the magnetic return circuit.

The shaft 37 may be constructed from a magnetically inert material that is sufficiently strong and stiff enough to withstand physical and mechanical stresses exerted thereon by the transfer of force and motion generated by the electromagnetic coil 41. The shaft 37 should be as light as possible to keep the resonant frequency and force output of the device high, while being resistant to bending, warping, deflecting, cracking, and/or breaking. For example, the magnetically inert material may comprise a fiber reinforced resin, a fiber reinforced epoxy resin, a fiberglass reinforced resin, a fiberglass reinforced epoxy resin, a carbon fiber reinforced resin, a carbon fiber reinforced epoxy resin, an aramid fiber reinforced resin, an aramid fiber reinforced epoxy resin, or a combination thereof.

The shaft 37 is free to slide through first and second central openings 25, 28 in the first and second end walls 23, 26 of the housing 21, and the first and second central holes 33, 36 in the first and second permanent magnets 31, 34. The electromagnetic coil 41 transmits all of the electromagnetic forces to the shaft 37 bearing on the load. Therefore, the shaft 37 should have excellent structural integrity and high mechanical stiffness. These properties can be realized with fiber reinforced resins and/or mandrels or forms comprising an epoxy-fiberglass composite, an epoxy-carbon composite, or similar lightweight, high strength materials.

As shown in FIG. 3, the electromagnetic coil 41 is affixed to or arranged on (e.g., mounted on) the central portion 38 of the shaft 37. The electromagnetic coil 41 has an outer surface 42 and a third central hole 43. In certain embodiments, a gap 48 comprising a non-ferromagnetic material (e.g., air) is interposed between the outer surface 42 of the electromagnetic coil 41 and the inner surface 30 of the side wall 29, or the inner surface of the magnetic field tuning element 49, whichever is closer.

In certain embodiments, the electromagnetic coil 41 is encased within an optional enclosure 44 (e.g., a frame, or the like) and/or attached to an optional support member (e.g., a carrier, bobbin, holder, or the like) (not shown). Such an enclosure 44 and/or support member may facilitate securing the electromagnetic coil 41 to the shaft 37. If present, the enclosure 44 and/or support member may comprise a magnetically inert material, (i.e., a non-ferromagnetic, non-electrically-conducting material). Examples of magnetically inert materials are discussed above with respect to the shaft 37 and are applicable here. For example, the electromagnetic actuator may include a self-supporting epoxy-reinforced, spiral wound electromagnetic coil fastened to the shaft 37. The electromagnetic coil can be connected to an electrical current source by wires that may run down a center of the shaft.

To remain within a desired working temperature of the devices, any heat build-up can be mitigated by natural passive or forced cooling. Alternatively, for devices that do not need to be run continuously, very high performance (high currents and high forces) can be achieved for short bursts if the duty cycle is low enough to enable effective heat transfer to the environment.

The electromagnetic opposing field actuator 20 is capable of exhibiting a symmetrical bidirectional force. Specifically, the electromagnetic coil 41 is capable of generating a force that causes linear axial displacement of the shaft 37 along the longitudinal axis 56 in either axial direction depending on the direction of current through the electromagnetic coil 41. In accordance with an exemplary aspect of the present invention, a substantially constant force that is linearly proportional to an applied drive current is generated over an entire actuation distance 55 of a bidirectional linear axial displacement of the shaft 37 along the longitudinal axis 56. In certain embodiments, the actuation distance 55 (shown in FIG. 4) of the bidirectional linear axial displacement of the shaft 37 along the longitudinal axis 56 may be less than 1 mm to greater than 50 mm, depending on the size of the housing (e.g., depending on the outer diameter of a cylindrical housing).

By applying a direct current to the electromagnetic coil 41, the electromagnetic coil 41 develops a magnetic field that will be opposed by one of the permanent magnets and attracted to the other, thereby creating co-directional additive mechanical forces on either end of the electromagnetic coil 41 towards one end of the device. The resultant force is mechanically coupled to the shaft by virtue of the shaft having the electromagnetic coil mounted thereon. Reversing the direction or polarity of the drive current through the electromagnetic coil 41 reverses the direction of force, thereby reversing the axial direction of linear axial displacement of the shaft 37 along the longitudinal axis 56.

In certain embodiments, the electromagnetic coil 41 comprises a multi-coil assembly comprising a plurality of electromagnetic coils. In certain embodiments, the electromagnetic coil 41 has an increasing number of wire turns with an increasing distance from the longitudinal axis 56. In certain embodiments, the electromagnetic coil 41 comprises an insulated conductive wire, an insulated copper magnet wire, an insulated aluminum wire, an insulated copper-coated aluminum wire, or combinations thereof.

In certain embodiments, the electromagnetic opposing field actuator 20 may further comprise an optional magnetic field tuning or focusing element 49. If present, the magnetic field focusing element 49 may comprise a permanent magnet or an assembly of permanent magnets arranged on (e.g., mounted on, in contact with, integrated into, or embedded within) the inner surface 30 of the side wall 29. In certain embodiments, the magnetic field focusing element 49 comprises an assembly of permanent magnets circumferentially arranged on (e.g., mounted on, in contact with, integrated into, or embedded within) the inner surface 30 of the side wall 29 to form a ring magnet that is polarized in a radial direction perpendicular to the longitudinal axis 56. In certain embodiments, the ring magnet is polarized in a radial direction perpendicular to the longitudinal axis 56 in a manner such that the ring magnet has an inward facing pole that may be attracted to the inward facing pole of both permanent magnets arranged on an end wall of the housing.

If the first and second permanent magnets are moved further apart to increase the actuation distance the shaft, having the electromagnetic coil mounted thereon, can travel, the force may decrease as the electromagnetic coil moves through the center of the working gap. Such a decrease in force, if present, can be substantially eliminated by a precise selection of magnetic field focusing magnets located on an inner surface of the side wall of the housing thereby forming an annular ring magnet around a periphery of the electromagnetic coil. Such magnetic field tuning elements or annular ring magnets can be divided into segments that are readily mounted in a slot cut into the inner surface of the side wall of the housing.

The magnetic field focusing element 49 may be used to modify the direction and/or the shape of the net magnetic field in the central cavity 22 of the housing 21 to facilitate the creation of a substantially uniform cancellation field (which will be discussed in greater detail below) through the operating travel volume of the shaft 37 during bidirectional linear axial displacement of the shaft 37 along the longitudinal axis 56 defined by the actuation distance 55 between the first and second permanent magnets 31, 34.

In certain embodiments, the magnetic field focusing element 49 comprises a permanent magnet or an assembly of permanent magnets having a maximum energy product ($BH_{max}$) of from 16 to more than 55 megaGauss-Oersteds (MGOe). For example, the magnetic field focusing element 49 may comprise a neodymium-iron-boron magnet, an assembly of neodymium-iron-boron magnets, a samarium-cobalt alloy magnet, an assembly of samarium-cobalt alloy magnets, or combinations thereof.

In certain embodiments, the electromagnetic opposing field actuator 20 may further comprise one or more guide mechanisms 45 (e.g., one or more bearings, bushings, low friction wear-resistant liner, or the like) suitable for guiding the movable shaft 37 along the longitudinal axis 56 and through the housing 21. The one or more guide mechanisms 45 may be interposed between the shaft 37 and the first central opening 25 of the first end wall 23 of the housing 21 and/or the second central opening 28 of the second end wall 26 of the housing 21. A thin contact separation is introduced between the shaft 37 and the first and second permanent magnets 31, 34 and/or the first and second end walls 23, 26 to reduce and/or obviate frictional loss.

The active magnetic train of the electromagnetic actuator 20 comprises the first and second permanent magnets 31, 34 and the electromagnetic coil 41. Items 31, 34 and 41 are also the as primary field generating components. The active magnetic train of the electromagnetic actuator 20 of the present invention is confined within housing 21 and bounded by the first end wall 23, the second end wall 26 and the side wall 29 of the housing 21.

The principal magnetic field in the electromagnetic actuator 20 is largely controlled by the opposing magnetic fields of the first and second permanent magnets 31, 34 interacting with the magnetic field of the movable electromagnetic coil 41. As previously discussed, a magnetic field focusing element 49 may be used to modify the direction and/or the shape of the net magnetic field in the central cavity 22 of the housing 21 to facilitate the creation of a substantially uniform cancellation field through the operating travel volume of the shaft 37 having the electromagnetic coil 41 arranged thereon.

In accordance with an exemplary aspect of the present invention, a core of an axial cancellation field 53 constituting a substantially reduced magnetic field and a substantially reduced magnetic flux density extends along the longitudinal axis 56 between the first and second permanent magnets 31, 34 having opposing magnetic fields. In accordance with an exemplary aspect of the present invention, a core of a radial cancellation field 54 constituting a substantially reduced magnetic field and a substantially reduced magnetic flux density extends from the central portion 38 of the shaft 37, having the electromagnetic coil 41 arranged thereon, in a plane perpendicular to the longitudinal axis 56.

The terms "cancellation field," "null field," "null" and "nulled" do not imply that the entire gap (e.g., air gap) between the first and second permanent magnets contains zero magnetic field, but rather that the opposing magnetic fields of the first and second permanent magnets (in combination with the electromagnetic coil, the optional magnetic field tuning elements, and the housing, which constitutes a ferromagnetic return circuit that fully encloses the permanent magnets, the electromagnetic coil, and the optional magnetic field tuning elements) deflect the magnetic field away from both: (1) the longitudinal axis 56 between the first and second permanent magnets 31, 34 to create a substantially reduced magnetic field and a substantially reduced magnetic flux density in the core of the axial cancellation field 53; and (2) the central portion 38 of the shaft 37, having the electromagnetic coil 41 arranged thereon, in a plane perpendicular to the longitudinal axis 56 to create a substantially reduced magnetic field and a substantially reduced magnetic flux density in the core of the radial cancellation field 54. The shaft 37 is therefore movable within a relatively large operating travel volume within the central cavity of the housing where the magnetic field is substantially in cancellation or nulled by the opposing magnetic fields of the first and second permanent magnets.

Such a nulling effect is schematically illustrated in FIG. 4. FIG. 4 illustrates primary lines of magnetic flux (dashed lines) and a cancellation field exhibited by the electromagnetic opposing field actuator of FIG. 3. As shown in FIG. 4, primary lines of magnetic flux 50 include high value contours 51 in a first vicinity near the inner surface 30 of the sidewall 29 and the outer surface 32 of the first permanent magnet 31, and in a second vicinity near the inner surface 30 of the sidewall 29 and the outer surface 35 of the second permanent magnet 34. As shown in FIG. 4, primary lines of magnetic flux 50 also include low value contours 52 that extend from the inner surface 30 of the sidewall 29 near the first and second end walls 23, 26 into the central cavity 22 of the housing 21.

Also shown is the approximate location of the axial cancellation field 53 and the radial cancellation field 54 resulting from the interaction of the first and second permanent magnets 31 and 34 having opposing magnetic fields, the electromagnetic coil 41, and the optional magnetic field tuning elements 49, if present. The magnetic field contours turn away from the center of the gap between the first and second permanent magnets and head radially toward the sidewalls of the housing (the magnetic return circuit), leading to a magnetic field distribution with maximum values adjacent to the first and second permanent magnets and radially close to the magnetic return circuit (housing) with levels dropping toward the axial and radial center of the gap. In certain embodiments, a true absolute zero null field may not be reached but magnetic field modeling of the electromagnetic actuator of the present invention indicate a magnetic field and flux density close to zero in the axial cancellation field 53 and the radial cancellation field 54. Accordingly, the net result is a substantially reduced magnetic field and a substantially reduced magnetic flux throughout most of the gap. Such a null region (central shaded area) in the axial cancellation field 53 and the radial cancellation field 54 constitutes <10%, oftentimes <1%, of the maximum magnetic field and magnetic flux exhibited when the first and second permanent magnets are arranged or aligned within the housing so that their poles attract one another.

In certain embodiments, efficient and effective operation of the electromagnetic actuator 20 may be optimized through the arrangement and spacing of the magnetic components to create the substantially uniform cancellation field. Accordingly, magnetic flux within the housing is located in the axial direction in a manner such that the magnetic field in the operating travel volume of the shaft 37 along the longitudinal axis 56 in the central cavity 22 of the housing 21 is effectively neutralized by the opposing magnetic fields of the first and second permanent magnets 31, 34.

Such a channeling of magnetic flux may be improved by introducing an optional first zone 46 comprising a non-ferromagnetic material (e.g., air) between the inner surface 30 of the side wall 29 and the outer surface 32 of the first permanent magnet 31, and/or an optional second zone 47 comprising a non-ferromagnetic material (e.g., air) between the inner surface 30 of the side wall 29 and the outer surface 35 of the second permanent magnet 34, so as to minimize the existence of magnetic flux paths in the operating travel volume and constrain much of the magnetic flux present within the housing and cavity to direct flux into the central cavity remain primarily in the axial direction prior in preference to entering the housing.

Therefore, the centrally directed flux lines from both ends of the device oppose and effectively cancel one another out while the externally directed flux lines move into the ferromagnetic housing across the end walls and through the sidewalls towards the central annulus where the electromagnetic coil moves. At this location, flux lines from the end walls meet and cancel in the same manner as the axial flux lines within the housing. Thus a central volume of cancelled or substantially reduced magnetic field is generated, the core of which runs through the central axial region along the longitudinal axis 56, and the central radial plane orthogonal to the longitudinal axis 56.

As a result of the substantially uniform cancellation field (i.e., the axial cancelation field 53 and the radial cancellation field 54) extending through the operating travel volume of the shaft 37 having the electromagnetic coil 41 arranged thereon, the electromagnetic actuator 20 of the present invention is capable of exhibiting a symmetrical bidirectional force that is substantially constant and linearly proportional to an applied drive current over substantially the entire actuation distance 55 of a bidirectional linear axial displacement of the shaft 37 along the longitudinal axis 56. In certain embodiments, a substantially constant force this is linearly proportional to a drive current is generated over at least 80 percent of an actuation distance of the bidirectional linear displacement of the shaft along the longitudinal axis, including, for example, at least 85 percent, 90 percent, 95 percent, 96 percent, 97 percent, 98 percent, 99 percent or 100 percent (i.e., entire actuation distance). Such a substantially uniform cancellation field in the operating travel volume of the shaft 37 removes the requirement for high magnetic fields to be developed locally.

Accordingly, the electromagnetic actuator of the present invention does not exhibit the extreme variations in magnetic fields and force exhibited by conventional electromagnetic actuators when the shaft traverses the actuation distance because the primary field generating components are configured to substantially cancel the magnetic field and magnetic flux density in the operating travel volume of the shaft 37 and any residual magnetic flux is effectively carried by the contiguous ferromagnetic housing 21.

The electromagnetic actuator of the present invention creates a substantially uniform cancellation field in the vicinity of the shaft to generate a set of hitherto unobtainable performance parameters. These include extended travel available to the shaft, high and substantially invariant magnetic force on the shaft while traversing the substantially uniform cancellation field, and proportionality between force and current over a wide range of currents. In addition, the substantially uniform cancellation field relaxes many of the more exacting requirements and engineering tolerances (e.g., tight air gaps, laminated and high permeability magnetic return elements, etc.) that constrain the design and construction of electric motors and actuators to achieve high force and reduce magnetic losses. This design methodology can be tailored to fit a wide range of desired device sizes, required force outputs, displacement ranges, etc., peculiar to a given application. Although a specific embodiment of the electromagnetic actuator of the present invention is described above, other embodiments of the electromagnetic actuator may be configured and custom tailored to satisfy various mechanical, electrical and/or magnetic requirements to achieve desired performance characteristics for a specific application.

The electromagnetic actuator 20 of the present invention exhibits a substantially constant force over a wide range of axial displacements. The electromagnetic actuator of the present invention provides substantially invariant force over the actuation distance and linear force versus drive current over several decades of resolution, and provides symmetrical bidirectional drive. Accordingly, the electromagnetic coil of the present invention can be operated at a constant current to replicate the mechanical properties of a constant force spring across the entire displacement range. The electromagnetic actuator 20 of the present invention also provides force free motion when the electromagnetic coil 41 is powered off, substantially constant and linearly proportional force to applied drive current relationship over a broad range (e.g., over three or more decades) of force, and low ohmic losses when held at any linear axial displacement over the entire actuation distance 55 of range of travel of the shaft 37. These performance characteristics of the electromagnetic actuator 20 of the present invention are achieved without mechanical mechanisms (e.g., elastic elements such as springs, or gears), latching mechanisms (e.g., mechanical return elements), or active electromechanical or electronic linearization mechanisms. The electromagnetic actuator 20 of the present invention is stable in any position in the linear displacement range and has no latch-up condition with power removed. This is true for both the moving captive coil and the moving captive magnet variations of the present invention.

The electromagnetic actuator 20 of the present invention is bidirectional and can supply force equally well in either direction by reversing the polarity or current direction of the electromagnetic coil. The forces generated by the electromagnetic actuator 20 of the present invention are linearly proportional to the current driven into the electromagnetic coil and this linearity extends over several decades of force. The forces developed by the electromagnetic coil of the present invention also remain substantially constant over the entire travel or actuation distance of the shaft for a given drive current. Accordingly the electromagnetic coil of the present invention can be operated at a constant current to replicate the mechanical properties of a constant force spring across the entire displacement range.

In certain embodiments, the active magnetic train is substantially free of un-poled ferromagnetic components. This has two effects. First, without ferromagnetic paths in the volume containing the active magnetic train a preponderance of the magnetic flux return lines are forced to occupy a path defined by the contiguous ferromagnetic housing. Second, the active magnetic train in the present invention is not subject to the limitations associated with un-poled ferromagnetic components employed in conventional electromagnetic actuators. Such limitations include the need for the movable element to be in very close proximity to the permanent magnets and/or the energized electromagnetic coil in order to acquire induced magnetic moments and thus develop useful magnetic fields.

In certain embodiments, the symmetrical bidirectional force may remain substantially constant irrespective of axial displacement of the shaft until an orthogonal strain (which may be defined as a ratio of the axial displacement of the shaft divided by the orthogonal dimension (i.e., an outer diameter) of a cylindrical housing) exceeds 0.7, or 0.8 or 0.9. For example, in certain embodiments the orthogonal strain of an electromagnetic actuator having an axial displacement of 52.5 mm and an outer diameter of 75 mm for a cylindrical housing is 0.7. Similarly, the orthogonal strain of an electromagnetic actuator having an axial displacement of 75 mm and an outer diameter of 105 mm for a cylindrical housing is 0.7. In certain embodiments, the orthogonal strain of the electromagnetic actuator of the present invention may be less than 0.9, less than 0.8, or less than 0.7, including for example, 0.6 or less, 0.5 or less, 0.4 or less, 0.3 or less, 0.2 or less, or 0.1 or less.

Accordingly, the axial displacement of the shaft and the orthogonal dimension of the housing are relatively unconstrained and limited only by the size and shape of the magnetic field that can be created by a given magnetic configuration (e.g., the physical arrangement and magnetic properties of first and second permanent magnets 31, 34, the electromagnetic coil 41, and the optional magnetic field tuning element 49, if present) of the electromagnetic actuator to provide a substantially constant force over a wide range of axial displacements. Therefore, the axial displacement of the shaft and the orthogonal dimension of the housing can be optimized for various purposes such as ease of assembly and/or to meet specific design criteria such as maximum force or displacement per unit mass, per unit volume, or per unit power dissipation, of the electromagnetic actuator.

The actuation distance or bidirectional linear axial displacement of the movable shaft 37 may be continuously variable between the first permanent magnet 31 and the second permanent magnet 34. Alternatively, the position of the movable shaft 37 can be set to arbitrary values at any given axial location along the longitudinal axis 56 in cases where the shaft 37 is exerting force against an external balancing force of equal magnitude and hence not causing motion. Because the magnetic environment (i.e., the magnetic field and the magnetic flux density) is designed to be substantially reduced in a uniform manner (e.g., invariant axially along the longitudinal axis 56, and invariant radially extending from the central portion 38 of the shaft 37, having the electromagnetic coil 41 arranged thereon, in a plane perpendicular to the longitudinal axis 56) in the operating travel volume of the movable shaft 37, the force exerted on the movable shaft 37 remains substantially constant irrespective of the axial displacement of the shaft 37. In addition, the substantially uniform cancellation field in the operating travel volume significantly reduces the magnetic flux density that has to be carried by the housing because the field cancellation effect extends radially into the housing.

Thus the electromagnetic actuators of the present invention may generate substantially uniform force over the entire range of actuation, and exhibit a force that is linearly proportional to applied current over a wide range of applied current, and provide full bidirectional actuation in the absence of conventional latching mechanisms, which typically cause steep changes in force relative to actuation distance. One advantageous feature of the electromagnetic actuators of the present invention is their mechanical simplicity in that they do not require complex linkages to couple the actuation forces to an external load or mechanism. The electromagnetic actuators of the present invention are also mechanically simple, e.g., with only a single moving assembly, and inherently magnetically shielded by a housing that exhibits little or no external magnetic field leakage. Another advantage is their inherently silent operation since they do not rely on anything other than a shaft having an electromagnetic coil mounted thereon to produce linear motion and thus has only one moving part or assembly.

Figure 5:
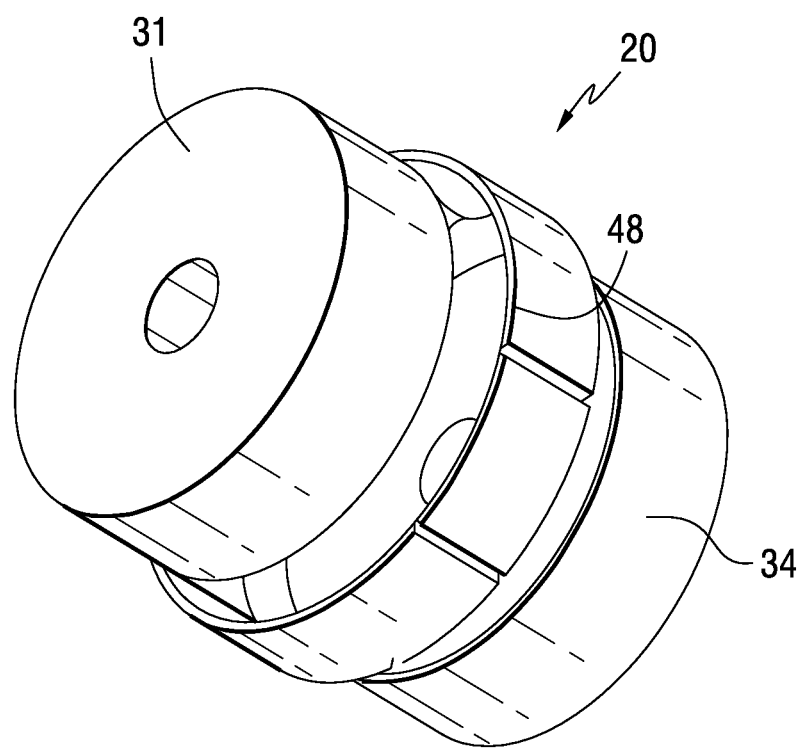
FIG. 5 is a partially schematic isometric view illustrating the relative positions of the stationary permanent magnets and a magnetic field tuning element for the electromagnetic opposing field actuator of FIG. 3.

FIG. 5 illustrates the relative positions of the two stationary permanent magnets 31, 34 and the magnetic field tuning element 49 for the electromagnetic opposing field actuator 20 of FIGS. 3 and 4, in the absence of the housing 21, the shaft 37 and the movable electromagnetic coil 41 for illustration purposes. FIG. 5 shows the position of the magnetic field tuning element 48 relative to the position of the two stationary permanent magnets 31, 34. The magnetic field tuning element 48, can be polarized in a radial direction through the thin section of the ring magnet. The magnetic field tuning element 48 can be assembled in the device as a circumferential array of magnetic segments to form an annular ring magnet with one pole facing the axis of the device and the other pole facing radially outward from the annular ring magnet. The magnetic polarity may be such that the inner pole of the annular ring magnet is attracted to the inward facing poles of both of the stationary permanent magnets 31, 34 to evenly distribute the magnetic field axially within the operating travel volume that is swept by the coil mounted on the shaft. This linearizes the force as the coil moves across the gap between the two main field magnets. The magnetic field tuning element 48 may be made of the same material type and/or material quality as the permanent magnets and can be cut into segments for ease of manufacturing. The magnetic field tuning element 48 can also be made with different field strength and dimensions as required to linearize the force across the gap between the main field magnets.

In certain preferred embodiments, the primary field generating components in the electromagnetic actuator of the present invention are disposed alternately by type and serially along the longitudinal axis of motion. Thus the active magnetic train comprises either a permanent magnet assembly interposed between two coil assemblies or a coil assembly interposed between two permanent magnet assemblies. To conform to different geometrical constraints in the application or to achieve higher output, this sequence may be extended along the axis by appending more stages of alternating permanent magnets and coils. In all cases, work output from the primary field generating components is enabled by relative motion of permanent magnet(s) towards and away from coil(s) or vice versa.

In certain embodiments, the active magnetic train in the actuators is confined to the volume of the central cavity defined by inner surfaces of the side and end walls of the ferromagnetic housing. Where external connection to a load must be established, it may be accomplished with a magnetically inert material (i.e., a non-electrically-conducting and non-ferromagnetic material), such as a fiber reinforced polymer shaft. Accordingly, during operation of the electromagnetic actuator in accordance with embodiments of the present invention, no permanent magnets, un-poled ferromagnetic elements, electromagnetic coils or electromagnets travel into and/or through the central openings of the first and second end walls.

The electromagnetic actuators of the present invention have a very low magnetic field return loss compared to conventional electromagnetic devices because the main field magnets of the present invention are arranged in cancellation or opposition. This substantially eliminates losses in the field returns since the majority of the return field is in cancellation allowing the housing to be made from moderate permeability materials such as 416 stainless steel.

Many design variants and configurations of the magnetic actuator of the present invention are possible, some of which are presented below in order to illustrate the flexibility and general applicability of the technology of the present invention.

Figure 6:
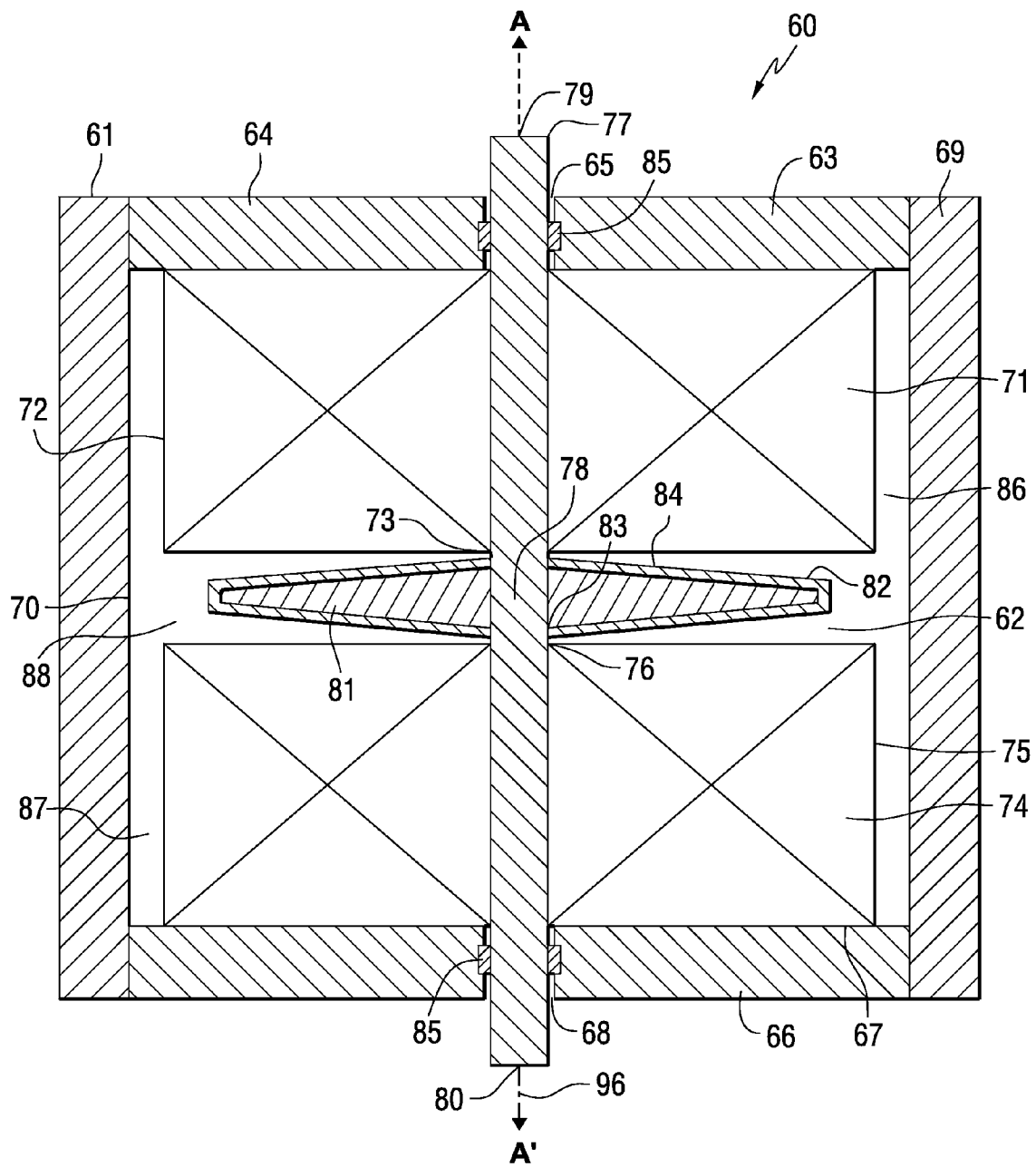
FIG. 6 is a partially schematic side sectional view of an electromagnetic opposing field actuator comprising two stationary electromagnetic coils and a movable permanent magnet in accordance with another embodiment of the present invention.

FIG. 6 illustrates the captive coil embodiment of an electromagnetic opposing field actuator 60 comprising a housing 61, two stationary electromagnetic coils 71, 74, a shaft 77, and a movable permanent magnet 81 in accordance with another embodiment of the present invention.

With the exception of first and second stationary electromagnetic coils 71, 74 being arranged on the first and second end walls 63, 66, respectively, and a movable permanent magnet 81 being arranged on the central portion 78 of the shaft 77, the electromagnetic opposing field actuator 60 illustrated in FIG. 6 comprises structural components and corresponding materials that are similar to those discussed above with respect to the electromagnetic opposing field actuator 20 illustrated in FIGS. 3-5. Accordingly, the relevant descriptions above are incorporated herein by reference in their entirety.

As shown in FIG. 6, the housing 61 has a first end wall 63, a second end wall 66 opposite the first end wall 63, and a side wall 69 interconnecting the first and second end walls 63, 66.

The first end wall 63 has an inner surface 64 and a first central opening 65. The second end wall 66 has an inner surface 67 and a second central opening 68. The side wall 69 has an inner surface 70. In certain embodiments, the side wall 69 has a cylindrical shape. The first end wall 63, the second end wall 66, and the side wall 69 of the housing 61 define a central cavity 62.

As shown in FIG. 6, the first electromagnetic coil 71 is arranged on (e.g., mounted on, in contact with, integrated into, or embedded within) the inner surface 64 of the first end wall 63. The first electromagnetic coil 71 has an outer surface 72, a first central hole 73, and an inward facing pole when energized. In certain embodiments, a first zone 86 comprising a non-ferromagnetic material (e.g., air) is interposed between the outer surface 72 of the first electromagnetic coil 71 and the inner surface 70 of the side wall 69. In certain embodiments, the first electromagnetic coil 71 comprises a multi-coil assembly comprising a plurality of electromagnetic coils. In certain embodiments, the first electromagnetic coil 71 has an increasing number of wire turns with an increasing distance from the longitudinal axis 96.

As shown in FIG. 6, the second electromagnetic coil 74 is arranged on (e.g., mounted on, in contact with, integrated into, or embedded within) the inner surface 67 of the second end wall 66. The second electromagnetic coil 74 has an outer surface 75, a second central hole 76, and an inward facing pole when energized. In certain embodiments, a second zone 87 comprising a non-ferromagnetic material (e.g., air) is interposed between the outer surface 75 of the second electromagnetic coil 74 and the inner surface 70 of the side wall 69. In certain embodiments, the second electromagnetic coil 74 comprises a multi-coil assembly comprising a plurality of electromagnetic coils. In certain embodiments, the second electromagnetic coil 74 has an increasing number of wire turns with an increasing distance from the longitudinal axis 96.

The first and second electromagnetic coils 71, 74 can be arranged on either side of the permanent magnet 81 so that their fields in the working gap are in opposition when energized. In other words they can be arranged so that the north poles are facing each other or the south poles are facing each other when energized. This creates an opposing field or cancellation field. Magnetic field models of this arrangement show that a central region between the two electromagnetic coils 71, 74 is primarily occupied by a cancellation field.

Figure 7:
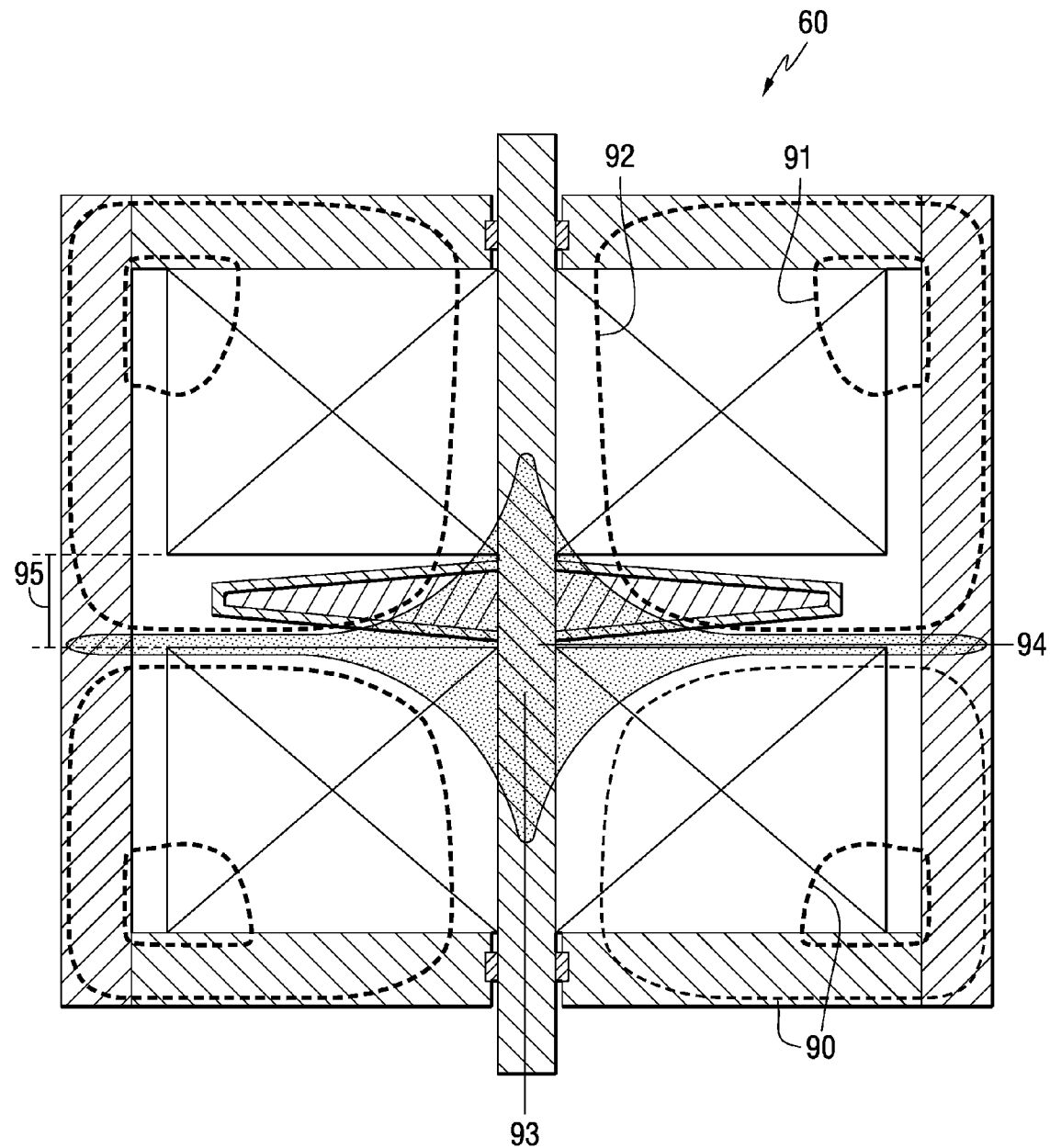
FIG. 7 is a partially schematic side sectional view illustrating primary lines of magnetic flux and a cancellation field exhibited by the electromagnetic opposing field actuator of FIG. 6 with the coils energized and the magnet mechanically held in the central position.

The first and second electromagnetic coils 71, 74 having opposing magnetic fields when energized are separated by a distance sufficient to allow the shaft 77 and the permanent magnet 81 arranged on the central portion 78 of the shaft 77 to traverse the entire actuation distance 95 (as shown in FIG. 7) of the bidirectional linear axial displacement.

As shown in FIG. 6, the shaft 77 is movable along a longitudinal axis 96 (A-A'), which is central to and parallel with the side wall 69 and perpendicular to the first and second end walls 63, 66. The shaft 77 has a central portion 78 interposed between the first and second electromagnetic coils 71, 74. The central portion 78 of the shaft 77 is arranged in the central cavity 62 of the housing 61. The shaft 77 may also have a first end portion 79 extending through both the first central hole 73 of the first electromagnetic coil 71 and the first central opening 65 of the first end wall 63 of the housing 61. The shaft 77 may also have a second end portion 80 extending through both the second central hole 76 of the second electromagnetic coil 74 and the second central opening 68 of the second end wall 66 of the housing 61. A relatively thin contact separation (not shown) may exist between the shaft 77 and the first and second end walls 63, 66 and/or the first and second electromagnetic coils 71, 74 to prevent contact during motion.

As shown in FIG. 6, the permanent magnet 81 is affixed to or arranged on (e.g., mounted on) the central portion 78 of the shaft 77. The permanent magnet 81 has an outer surface 82 and a third central hole 83. In certain embodiments, a third zone 88 comprising a non-ferromagnetic material (e.g., air) is interposed between the outer surface 82 of the permanent magnet 81 and the inner surface 70 of the side wall 69. In certain embodiments, the permanent magnet 81 comprises an assembly of permanent magnets.

In certain embodiments, the permanent magnet 81 is encased within an optional enclosure 84 (e.g., a frame, or the like) and/or attached to an optional support member (e.g., a carrier, bobbin, holder, or the like) (not shown). Such an enclosure 84 and/or support member may facilitate securing the permanent magnet 81 to the shaft 77.

The electromagnetic opposing field actuator 60 is capable of exhibiting a symmetrical bidirectional force. Specifically, the first and second electromagnetic coils 71, 74 are capable of generating a force when energized that causes linear axial displacement of the shaft 77 along the longitudinal axis 96 in either axial direction depending on the direction of current through the first and second electromagnetic coils 71, 74. Alternatively, the shaft 77 may remain force-balanced in an intermediate position. Referring to FIG. 7, and in accordance with an exemplary aspect of the present invention, a substantially constant force that is linearly proportional to an applied drive current is generated over an entire actuation distance 95 of a bidirectional linear axial displacement of the shaft 77 along the longitudinal axis 96. In certain embodiments, the actuation distance 95 of the bidirectional linear axial displacement of the shaft 77 along the longitudinal axis 96 may be less than 1 mm or greater than 50 mm.

By applying a direct current to the first and second electromagnetic coils 71, 74, they develop a magnetic field that will be opposed to one side of the permanent magnet 81 and attracted to the other side of the permanent magnet 81, thereby creating co-directional additive mechanical forces on either side of the permanent magnet 81 towards one end of the device. The resultant force is mechanically coupled to the shaft 77 by virtue of the shaft having the permanent magnet 81 mounted thereon. Reversing the direction or polarity of the drive current through the first and second electromagnetic coils 71, 74 reverses the direction of force, thereby reversing the axial direction of linear axial displacement of the shaft 77 along the longitudinal axis 96.

In certain embodiments, the electromagnetic opposing field actuator 60 may further comprise one or more guide mechanisms 85 (e.g., one or more bearings, bushings, low friction wear-resistant liner, or the like) suitable for guiding the movable shaft 77 along the longitudinal axis 96 and through the housing 61. The one or more guide mechanisms 85 may be interposed between the shaft 77 and the movable first central opening 65 of the first end wall 63 of the housing 61 and/or the second central opening 68 of the second end wall 66 of the housing 61.

FIG. 7 illustrates primary lines of magnetic flux (dashed lines) and a cancellation field exhibited by the electromagnetic opposing field actuator of FIG. 6 with the coils energized and the magnet mechanically held in the central position.

As shown in FIG. 7, primary lines of magnetic flux 90 include high value contours 91 in a first vicinity near the inner surface 70 of the sidewall 69 and the inner surface 64 of the first end wall 63, and a second vicinity near the inner surface 70 of the sidewall 69 and the inner surface 67 of the second end wall 66. As shown in FIG. 7, primary lines of magnetic field flux 90 also include low value contours 92 that extend from the inner surface 70 of the sidewall 69 near the first and second end walls 63, 66 well in into the central cavity 62 of the housing 61.

Also shown is the approximate location of the axial cancellation field 93 and the radial cancellation field 94 resulting from the interaction of the first and second electromagnetic coils 71, 72 having opposing magnetic fields when energized, and the permanent magnet 81. The magnetic field contours turn away from the center of the working gap between the first and second electromagnetic coils 71, 74 and head radially toward the sidewall 69 of the housing 61 (the magnetic return circuit) leading to a magnetic field distribution with maximum values adjacent to the first and second electromagnetic coils 71, 74 and radially close to the magnetic return circuit (housing) with levels dropping toward the axial and radial center of the working gap. In certain embodiments, a true absolute zero null field may not be reached but magnetic field modeling of the electromagnetic actuator of the present invention indicates a magnetic field and flux density close to zero in the axial cancellation field 93 and the radial cancellation field 94. Accordingly, the net result is a substantially reduced magnetic field and a substantially reduced magnetic flux throughout most of the gap. Such a "null" region (central shaded area) in the axial cancellation field 93 and the radial cancellation field 94 constitutes <10%, oftentimes <1%, of the maximum magnetic field and magnetic flux exhibited when the first and second electromagnetic coils 71, 74 are arranged or aligned within the housing so that their poles attract one another.

In certain embodiments, efficient and effective operation of the electromagnetic actuator 60 may be optimized through the arrangement and spacing of the magnetic components to create the substantially uniform cancellation field. Accordingly, magnetic flux within the housing is located in the axial direction in a manner such that the magnetic field in the operating travel volume of the shaft 77 along the longitudinal axis 96 in the central cavity 62 of the housing 61 is effectively neutralized by the opposing magnetic fields of the first and second electromagnetic coils 71, 74.

Such a channeling of magnetic flux may be improved by introducing an optional first zone 86 comprising a non-ferromagnetic material (e.g., air) between the inner surface 70 of the side wall 69 and the outer surface 72 of the first electromagnetic coil 71, and/or an optional second zone 87 comprising a non-ferromagnetic material (e.g., air) between the inner surface 70 of the side wall 69 and the outer surface 75 of the second electromagnetic coil 74, so as to minimize the existence of magnetic flux paths in the operating travel volume and constrain much of the magnetic flux present within the housing cavity to remain primarily in the axial direction prior in preference to entering the housing.

Therefore, the centrally directed flux lines from both ends of the device oppose and effectively cancel one another out while the externally directed flux lines move into the ferromagnetic housing across the end walls and through the sidewalls towards the central annulus where the permanent magnet moves. At this location, flux lines from the end walls meet and cancel in the same manner as the axial flux lines within the housing. Thus a central volume of cancelled or substantially reduced magnetic field is generated, the core of which runs through the central axial region along the longitudinal axis 96, and the central radial plane orthogonal to the longitudinal axis 96.

As a result of the substantially uniform cancellation field (i.e., the axial cancelation field 93 and the radial cancellation field 94) extending through the operating travel volume of the shaft 77 having the permanent magnet 81 arranged thereon, the electromagnetic actuator 60 of the present invention is capable of exhibiting a symmetrical bidirectional force that is substantially constant and linearly proportional to an applied drive current over an entire actuation distance 95 of a bidirectional linear axial displacement of the shaft 77 along the longitudinal axis 96. Such a substantially uniform cancellation field in the operating travel volume of the shaft 77 removes the requirement for high magnetic fields to be developed locally.

Figure 8:
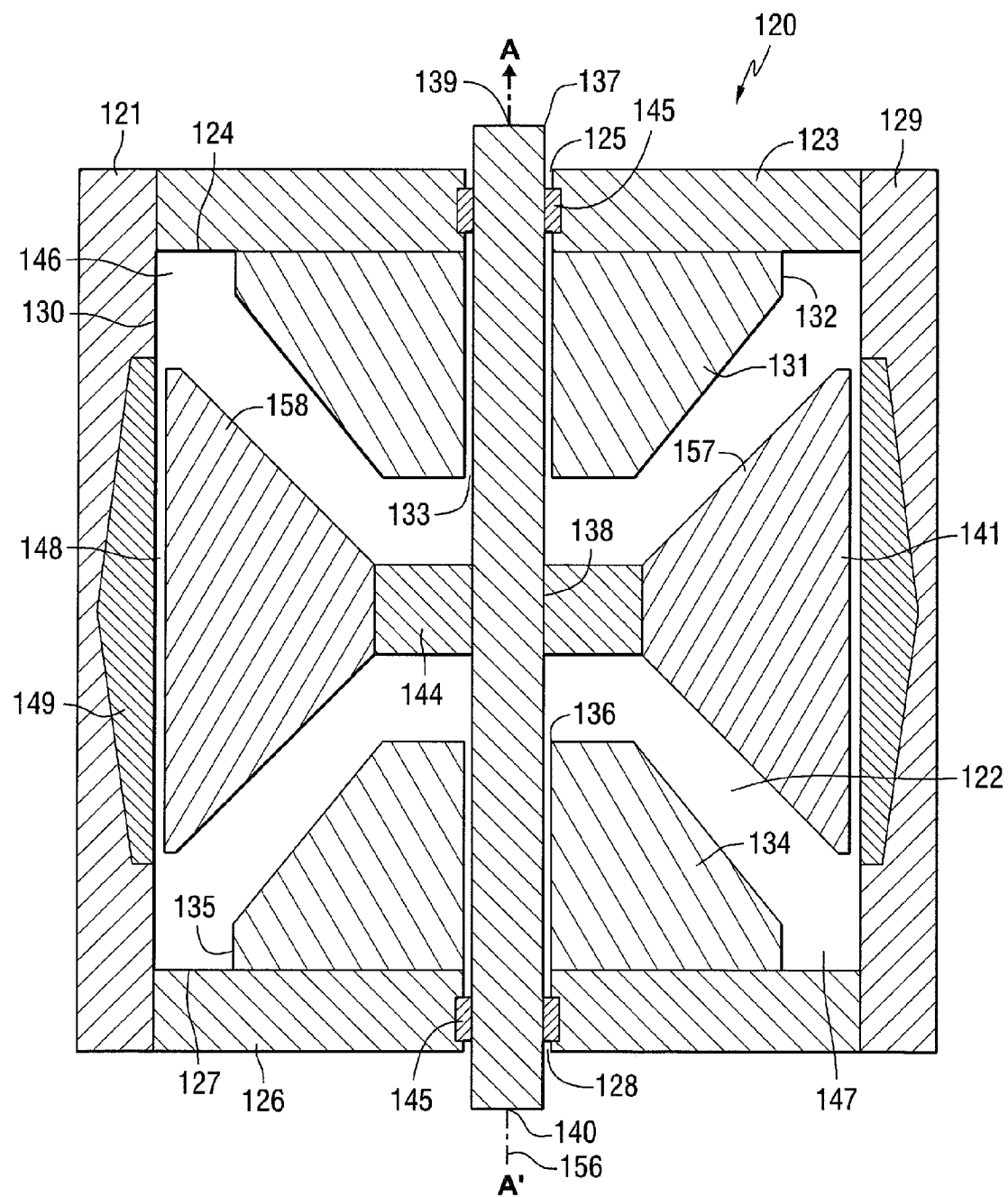
FIG. 8 is a partially schematic side sectional view illustrating an electromagnetic opposing field actuator comprising two stationary permanent magnets and a movable electromagnetic coil assembly optimized for maximum force per Watt in accordance with another embodiment of the present invention.

FIG. 8 illustrates an electromagnetic opposing field actuator 120 comprising a housing 121 made of a ferromagnetic material, two stationary permanent magnets 131, 134, a shaft 137, a movable electromagnetic coil 141, and a magnetic field tuning element 149 in accordance with an embodiment of the present invention. As shown in FIG. 8, the housing 121 has a first end wall 123, a second end wall 126 opposite the first end wall 123, and a side wall 129 interconnecting the first and second end walls 123, 126. The first end wall 123 has an inner surface 124 and a first central opening 125. The second end wall 126 has an inner surface 127 and a second central opening 128. The side wall 129 has an inner surface 130. In certain embodiments, the side wall 129 has a substantially cylindrical shape. The first end wall 123, the second end wall 126, and the side wall 129 of the housing 121 define a central cavity 122.

As shown in FIG. 8, the first permanent magnet 131 is arranged on (e.g., mounted on, in contact with, integrated into, or embedded within) the inner surface 124 of the first end wall 123. The first permanent magnet 131 has an outer surface 132, a first central hole 133, and an inward facing pole. In certain embodiments, a first gap or zone 146 comprising a non-ferromagnetic material (e.g., air) is interposed between the outer surface 132 of the first permanent magnet 131 and the inner surface 130 of the side wall 129. In certain embodiments, the first permanent magnet 131 comprises an assembly of permanent magnets.

As shown in FIG. 8, the second permanent magnet 134 is arranged on (e.g., mounted on, in contact with, integrated into, or embedded within) the inner surface 127 of the second end wall 126. The second permanent magnet 134 has an outer surface 135, a second central hole 136, and an inward facing pole arranged to repel the inward facing pole of the first permanent magnet 131. Accordingly, the first and second permanent magnets 131, 134 have opposing magnetic fields extending into the central cavity 122. In certain embodiments, a second gap or zone 147 comprising a non-ferromagnetic material (e.g., air) is interposed between the outer surface 135 of the second permanent magnet 134 and the inner surface 130 of the side wall 129. In certain embodiments, the second permanent magnet 134 comprises an assembly of permanent magnets.

As shown in FIG. 3, the shaft 137 is movable along the longitudinal axis 156 (A-A'), which is central to and parallel with the side wall 129 and perpendicular to the first and second end walls 123, 126. The shaft 137 has a central portion 138 interposed between the first and second permanent magnets 131, 134. The central portion 138 of the shaft 137 is arranged in the central cavity 122 of the housing 121. The shaft 137 may also have a first end portion 139 extending through both the first central hole 133 of the first permanent magnet 131 and the first central opening 125 of the first end wall 123 of the housing 121. The shaft 137 may also have a second end portion 140 extending through both the second central hole 136 of the second permanent magnet 134 and the second central opening 128 of the second end wall 126 of the housing 121. A relatively thin contact separation (bushing, not shown) may exist between the shaft 137 and the first and second end walls 123, 126 and/or the first and second permanent magnets 131, 134 to prevent contact during motion.

Although the first central hole 133, the first central opening 125, the second central hole 136, and the second central opening 128 are magnetically equivalent to air, they only have to be large enough to accommodate a relatively thin shaft 137. Therefore, such holes or openings cause only minimal, if any, disruption to the magnetic return circuit or the operational field, especially since the magnetic flux in this vicinity of the central cavity is dominated by a null field zone. Additionally, the area of the shaft opening can readily skirt around such small, effectively air-filled holes or openings with minimal course deviation, change in flux concentration, and/or adverse impact on the overall flux carried by or passing through the housing is also an area of null or reduced magnetic field within the housing material.

The movable shaft 137 is capable of undergoing bidirectional linear axial displacement along the longitudinal axis 156 between the first and second permanent magnets 131, 134. The bidirectional linear axial displacement of the movable shaft 137 along the longitudinal axis 156 defines an actuation distance 155. The longitudinal axis 156 may be an axis of symmetry or lie in a plane of symmetry of the housing 121. In certain embodiments, the longitudinal axis 156 may be an axis of circular symmetry extending axially through a cylindrical housing.

The shaft 137 comprises a magnetically inert material. As used herein, the term "magnetically inert material" means a non-ferromagnetic, non-electrically-conducting material. In certain instances, the magnetically inert material may be locally electrically conductive, i.e., segments of a component, such as the shaft 137, may comprise electrically conductive portions separated by insulating portions so as to reduce or eliminate eddy current generation.

The shaft 137 comprises a magnetically inert material (i.e., a non-ferromagnetic, non-electrically-conducting material) because a shaft constructed from a ferromagnetic material would provide a magnetic shunt path, reducing the strength of the magnetic field by interfering with the cancellation field created in the displacement gap of the device. Furthermore, while a shaft constructed from an electrically-conductive, non-ferrous material would create eddy currents in the shaft creating heat and acting as a damper on the motion of the shaft during movement through the central holes 133, 136 of the permanent magnets 131, 134.

Since the shaft 137 comprises a magnetically inert material, the shaft 137 has essentially no role in the magnetic circuit and thus does not constitute a component of the active magnetic train. As discussed in greater detail below, the electromagnetic coil 141 is affixed to or arranged on (e.g., mounted on) the central portion 138 of the shaft 137. Accordingly, the shaft 137 is designed and configured to meet desired mechanical attributes and physical properties for supporting the electromagnetic coil 141 and withstanding any physical and mechanical stresses imposed thereon by the transfer of force and motion generated by the electromagnetic coil. The size and/or diameter of the shaft 137 can be minimized to conserve space, reduce mass, and/or reduce disruption to the magnetic return circuit.

The shaft 137 may be constructed from a magnetically inert material that is sufficiently strong and stiff enough to withstand physical and mechanical stresses exerted thereon by the transfer of force and motion generated by the electromagnetic coil 141. The shaft 137 should be as light as possible to keep the resonant frequency and force output of the device high, while being resistant to bending, warping, deflecting, cracking, and/or breaking. For example, the magnetically inert material may comprise a fiber reinforced resin, a fiber reinforced epoxy resin, a fiberglass reinforced resin, a fiberglass reinforced epoxy resin, a carbon fiber reinforced resin, a carbon fiber reinforced epoxy resin, an aramid fiber reinforced resin, an aramid fiber reinforced epoxy resin, or a combination thereof.

The shaft 137 is free to slide through first and second central openings 125, 128 in the first and second end walls 123, 126 of the housing 121, and the first and second central holes 133, 136 in the first and second permanent magnets 131, 134. The electromagnetic coil 141 transmits all of the electromagnetic forces to the shaft 137 bearing on the load. Therefore, the shaft 137 should have excellent structural integrity and high mechanical stiffness. These properties can be realized with fiber reinforced resins and/or mandrels or forms comprising an epoxy-fiberglass composite, an epoxy-carbon composite, or similar light-weight, high strength materials.

In certain embodiments, the electromagnetic opposing field actuator 120 may further comprise one or more guide mechanisms 145 (e.g., one or more bearings, bushings, low friction wear-resistant liner, or the like) suitable for guiding the movable shaft 137 along the longitudinal axis 156 and through the housing 121. The one or more guide mechanisms 145 may be interposed between the shaft 137 and the first central opening 125 of the first end wall 123 of the housing 121 and/or the second central opening 128 of the second end wall 126 of the housing 121. A thin contact separation is introduced between the shaft 137 and the first and second permanent magnets 131, 134 and/or the first and second end walls 123, 126 to reduce and/or obviate frictional loss.

The active magnetic train of the electromagnetic actuator 120 comprises the first and second permanent magnets 131, 134 and the electromagnetic coil 141. Items 131, 134 and 141 are also the as primary field generating components. The active magnetic train of the electromagnetic actuator 120 of the present invention is confined within housing 121 and bounded by the first end wall 123, the second end wall 126 and the side wall 129 of the housing 121.

The principal magnetic field in the electromagnetic actuator 120 is largely controlled by the opposing magnetic fields of the first and second permanent magnets 131, 134 interacting with the magnetic field of the movable electromagnetic coil 141. As previously discussed, a magnetic field focusing element 149 may be used to modify the direction and/or the shape of the net magnetic field in the central cavity 122 of the housing 121 to facilitate the creation of a substantially uniform cancellation field through the operating travel volume of the shaft 137 having the electromagnetic coil 141 arranged thereon.

As shown in FIG. 8, the electromagnetic coil assembly 141 comprises electromagnetic coils 157, 158 having an increasing radial wire turn count with increasing distance from the longitudinal axis 156. The increasing radial wire turn count of the electromagnetic coils 157, 158 has a shape that is capable of equalizing the force over distance and maximizing the force produced by each turn of wire which results in the electromagnetic actuator 120 having an exceptionally high force per Watt (Newton/Watt) of electrical power input. The electromagnetic coils 157, 158 are mounted on a holder 144 that is arranged on the central portion 138 of the shaft 137. The holder 144 comprises a magnetically inert material (i.e., a non-ferromagnetic, non-electrically-conducting material) which may be similar to the magnetically inert material of the shaft 137.

Figure 9:
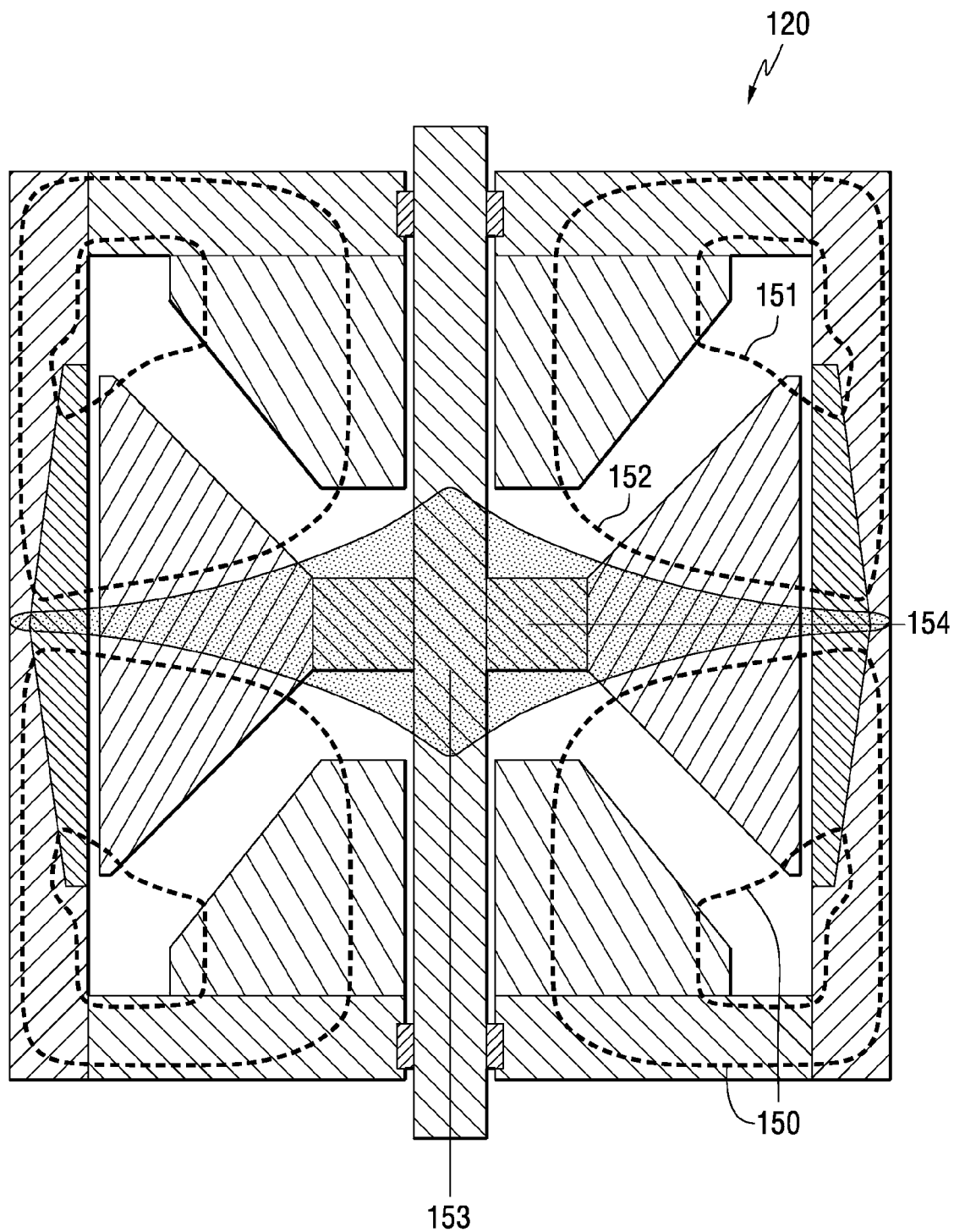
FIG. 9 is a partially schematic side sectional view illustrating primary lines of magnetic flux and a cancellation field exhibited by the electromagnetic opposing field actuator of FIG. 8.

FIG. 9 illustrates primary lines of magnetic flux (dashed lines) and a cancellation field exhibited by the electromagnetic opposing field actuator of FIG. 8. As shown in FIG. 9, primary lines of magnetic flux 150 include high magnetic field lines 151 in a first vicinity near the inner surface 130 of the sidewall 129 and the inner surface 124 of the first end wall 123, and a second vicinity near the inner surface 130 of the sidewall 129 and the inner surface 127 of the second end wall 126. As shown in FIG. 7, primary lines of magnetic flux 150 also include low magnetic field lines 152 that extend from the inner surface 130 of the sidewall 129 near the first and second end walls 123, 126 well into the central cavity 122 of the housing 121.

Also shown is the approximate location of the axial cancellation field 153 and the radial cancellation field 154 resulting from the interaction of the first and second permanent magnets 131, 134 having opposing magnetic fields when energized, the electromagnetic coils 157, 158 of the electromagnetic coil assembly, and the optional magnetic field tuning elements 149, if present. The magnetic field contours turn away from the center of the working gap between the first and second permanent magnets 131, 134 and head radially toward the sidewall 129 of the housing 121 (the magnetic return circuit) leading to a magnetic field distribution with maximum values adjacent to the first and second permanent magnets 131, 134 and radially close to the magnetic return circuit (housing) with levels substantially dropping toward the axial and radial center of the working gap.

In certain embodiments, a true absolute zero null field may not be reached but magnetic field modeling of the electromagnetic actuator of the present invention indicate a magnetic field and flux density close to zero in the axial cancellation field 153 and the radial cancellation field 154. Accordingly, the net result is a substantially reduced magnetic field and a substantially reduced magnetic flux throughout most of the gap. Such a null region (central shaded area) in the axial cancellation field 153 and the radial cancellation field 154 constitutes <10%, oftentimes <1%, of the maximum magnetic field and magnetic flux exhibited when the first and second permanent magnets 131, 134 are arranged or aligned within the housing so that their poles attract one another.

In certain embodiments, efficient and effective operation of the electromagnetic actuator 120 may be optimized through the arrangement and spacing of the magnetic components to create the substantially uniform cancellation field. Accordingly, magnetic flux within the housing is located in the axial direction in a manner such that the magnetic field in the operating travel volume of the shaft 137 along the longitudinal axis 156 in the central cavity 122 of the housing 121 is effectively neutralized by the opposing magnetic fields of the first and second permanent magnets 131, 134.

Such a channeling of magnetic flux may be improved by introducing an optional first gap or zone 146 comprising a non-ferromagnetic material (e.g., air) between the inner surface 130 of the side wall 129 and the outer surface 132 of the first permanent magnet 131, and/or an optional second zone 147 comprising a non-ferromagnetic material (e.g., air) between the inner surface 130 of the side wall 129 and the outer surface 135 of the second permanent magnet 134, so as to minimize the existence of magnetic flux paths in the operating travel volume and constrain much of the magnetic flux present within the housing cavity to remain primarily in the axial direction prior to entering the housing. In addition, the use of electromagnetic coils 157, 158 having an increasing radial wire turn count with increasing distance from the longitudinal axis 156 promotes flux lines through the first and second permanent magnets 131, 134 that run substantially parallel to the longitudinal axis 156.

Therefore, the centrally directed flux lines from both ends of the device oppose and effectively cancel one another out while the externally directed flux lines move into the ferromagnetic housing across the end walls and through the sidewalls towards the central annulus where the electromagnetic coil moves. At this location, flux lines from the end walls meet and cancel in the same manner as the axial flux lines within the housing. Thus a central volume of cancelled or substantially reduced magnetic field is generated, the core of which runs through the central axial region along the longitudinal axis 156, and the central radial plane orthogonal to the longitudinal axis 156.

As a result of the substantially uniform cancellation field (i.e., the axial cancelation field 153 and the radial cancellation field 154) extending through the operating travel volume of the shaft 137 having the electromagnetic coil 41 arranged thereon, the electromagnetic actuator 210 of the present invention is capable of exhibiting a symmetrical bidirectional force that is substantially constant and linearly proportional to an applied drive current over an entire actuation distance 155 of a bidirectional linear axial displacement of the shaft 137 along the longitudinal axis 156. Such a substantially uniform cancellation field in the operating travel volume of the shaft 137 removes the requirement for high magnetic fields to be developed locally.

Figure 10:
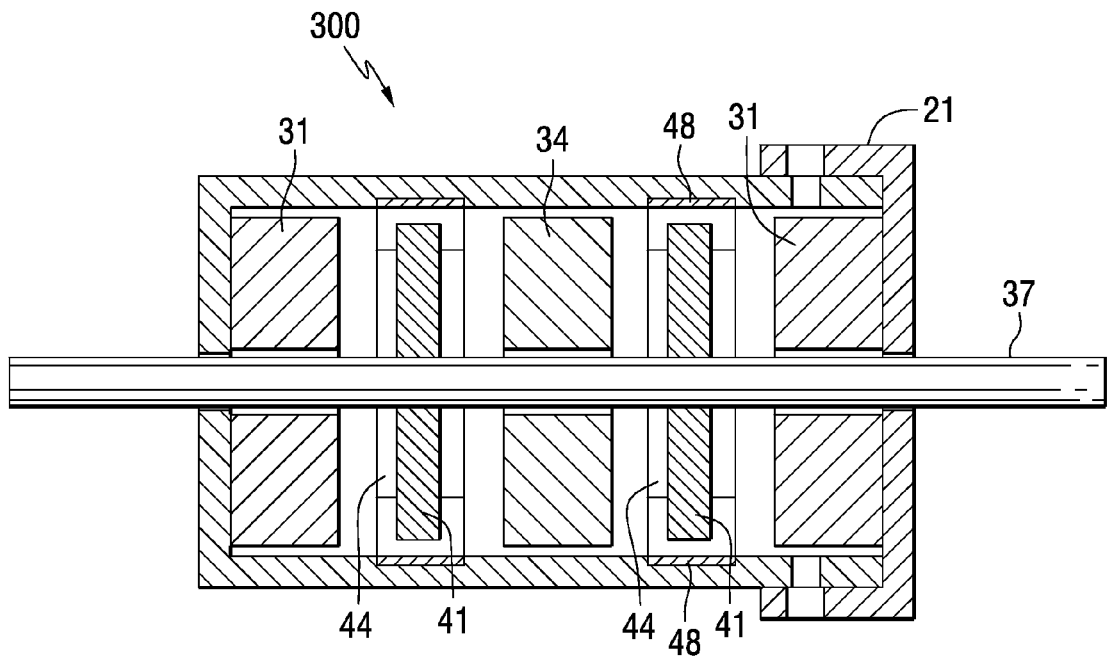
FIG. 10 is a partially schematic side sectional view illustrating a stacked multistage actuator assembly comprising a plurality of electromagnetic opposing field actuators similar to the actuator of FIG. 3 arranged in a series configuration in accordance with another embodiment of the present invention.
Figure 11:
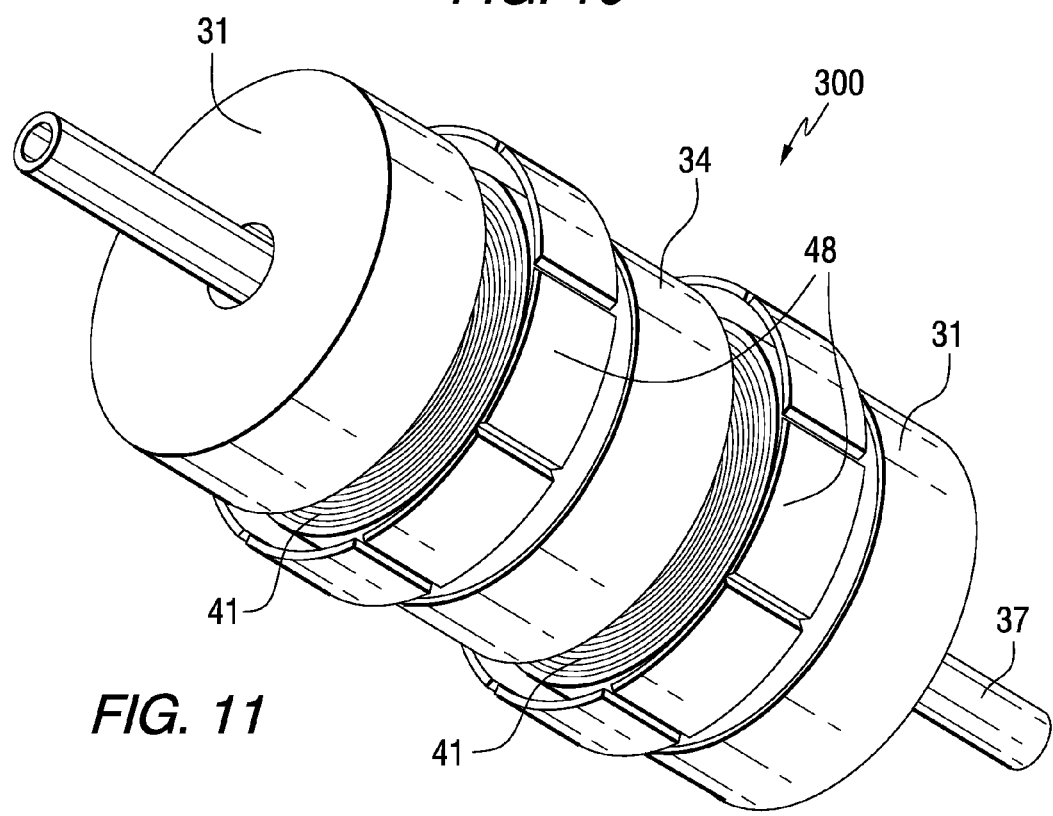
FIG. 11 is a partially schematic isometric view illustrating the relative positions of the stationary permanent magnets, movable electromagnetic coils and magnetic field tuning elements for the stacked multistage actuator assembly of FIG. 10.

FIG. 10 illustrates a stacked multistage (i.e., 2-stage) actuator assembly 300 comprising a plurality of the electromagnetic opposing field actuators 20 of FIG. 3 mechanically arranged in a series configuration in accordance with another embodiment of the present invention. FIG. 11 illustrates the relative positions of the stationary permanent magnets 31, 34, the movable electromagnetic coils 41, the shaft 37, and the magnetic field tuning elements 49 for the stacked multistage (i.e., 2-stage) actuator assembly 300 of FIG. 10, in the absence of the housing for illustration purposes.

As shown in FIGS. 10 and 11, the electromagnetic coils 41 are mounted on a common shaft 37 and thus move in unison. The magnetic field tuning elements 49 are mounted on an inner surface 30 of the side wall 29 of the housing 21 (not shown in FIG. 11) in comparable locations surrounding the working gap between the permanent magnets 31, 34 as in a single stage electromagnetic actuator.

If increased force output is required from an electromagnetic actuator (e.g., one having a limited diameter), multiple stages of the electromagnetic actuator can be constructed or stacked together in series resulting in co-directional additive force and/or displacement. By including only one additional permanent field magnet, the number of actuation sections doubles thereby doubling the available force per amp of drive current. Such a stacked multistage actuator may also improve the volumetric and mass efficiency thereof by having the adjacent stages share a common stationary permanent field magnet there between.

The magnetic circuit efficiency may also be enhanced because both the North pole and the South pole of any internal stationary permanent field magnet are both fully utilized, unlike the outward facing poles of stationary permanent field magnets located at the ends of a single stage or multi-stage device. This can eliminate any losses that may be associated with the unused magnetic field at each end of the device which is shunted by the housing.

Since a stacked multistage actuator uses only one permanent magnet between each successive stage, the polarity of the magnetic field reverses in each successive stage. Therefore, the polarity of the electromagnetic coils and magnetic field tuning elements in successive sections are also reversed in order to achieve additive forces. The linearity of the drive is preserved with the total output force being the product of the single stage output multiplied by the number of stages. An additional benefit is that the stages can now be switched in or out (physically or electrically) to increase or decrease the range of forces that can be applied for a given drive current.

Figure 12:
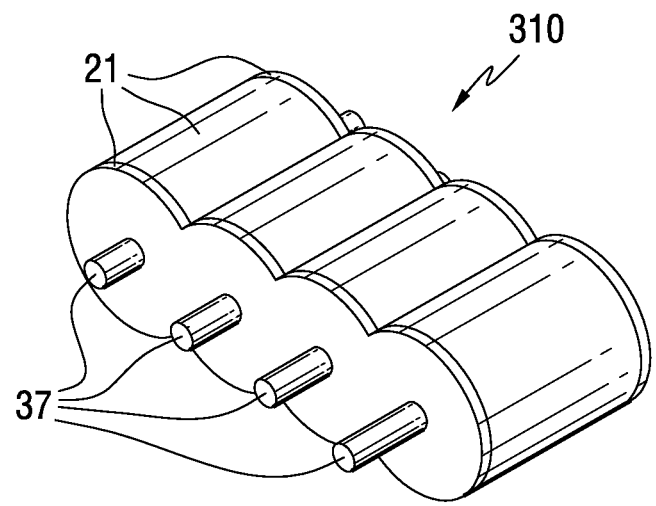
FIG. 12 is a partially schematic isometric view illustrating an actuator array comprising a plurality of electromagnetic opposing field actuators similar to the actuator of FIG. 3 arranged in a parallel configuration in accordance with another embodiment of the present invention.
Figure 13:
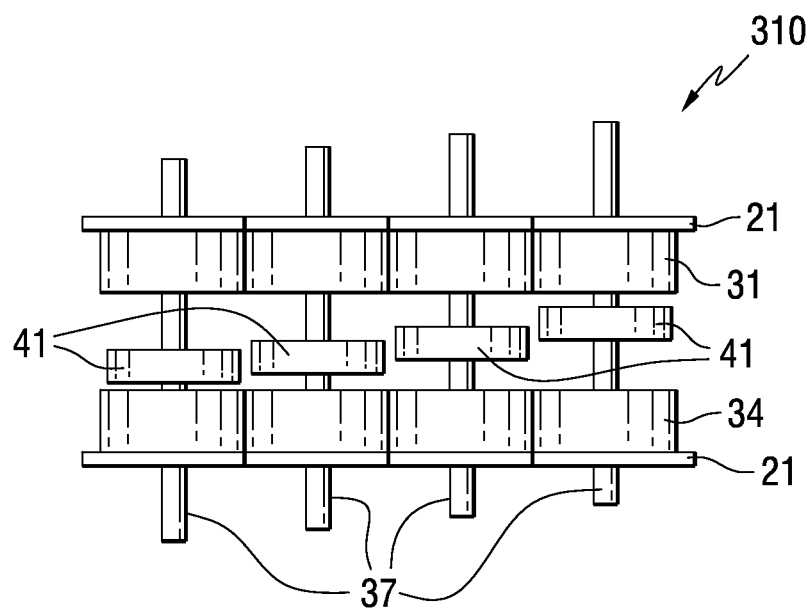
FIG. 13 is a partially schematic side view illustrating the relative positions of the stationary permanent magnets and the movable electromagnetic coils for the actuator array of FIG. 12.

FIG. 12 illustrates an actuator array comprising a plurality of the electromagnetic opposing field actuators of FIG. 3 mechanically arranged in a parallel configuration in accordance with another embodiment of the present invention. FIG. 13 illustrates the relative positions of the end walls of the housing, the stationary permanent magnets, the shafts, and the movable electromagnetic coils for the actuator array of FIG. 12, in the absence of the side walls of the housing and the magnetic field tuning elements for illustration purposes.

As shown in FIGS. 12 and 13, the actuator array 10 comprising a plurality of the electromagnetic opposing field actuators 20 of FIG. 3 is mechanically arranged in a parallel configuration within a common housing 21. The actuator array 20 comprises multiple pairs of permanent magnets 31, 34 within a single housing 21 and has multiple electromagnetic coils 41 each mounted on its own movable shaft 37. While circular electromagnetic coils 41 are illustrated, the electromagnetic coils are not limited to any particular shape, and indeed may have any desired shape custom designed or tailored for a particular purpose (e.g., to allow for convenient packaging of the actuators within the array).

Having multiple electromagnetic actuators 20 arranged in an actuator array within a common housing reduces the size and weight needed for a multiple actuator system. This embodiment allows for various arrangements of linear, circular, curved, or even coaxial arrays of multiple electromagnetic actuators, each of which sharing a common pair of permanent field magnets and capable of independent operation. It should be mentioned that stacked multiple actuator assemblies included in a common housing may allow for more force output in a thinner and longer package.

Figure 14:
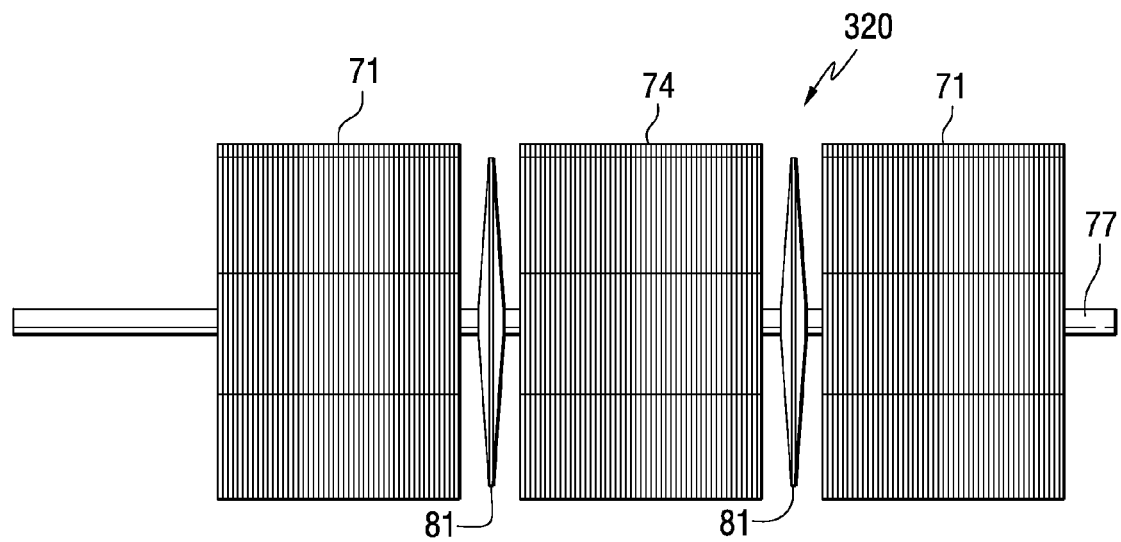
FIG. 14 is a partially schematic side view illustrating a stacked multistage actuator assembly comprising a plurality of electromagnetic opposing field actuators similar to the actuator of FIG. 6 arranged in a series configuration in accordance with another embodiment of the present invention.

FIG. 14 illustrates a stacked multistage (i.e., 2-stage) actuator assembly 320 comprising a plurality of the electromagnetic opposing field actuators 60 of FIG. 6 mechanically arranged in a series configuration, in the absence of the housing 61 for illustration purposes, in accordance with another embodiment of the present invention.

As shown in FIG. 14, the permanent magnets 81 are mounted on a common shaft 77 and thus move in unison. This embodiment allows for generation of large forces by incorporating very large stationary electromagnetic coils 71, without incurring any weight penalties that may be associated with a large electromagnetic coil or assembly thereof mounted on a movable shaft.

Figure 15:
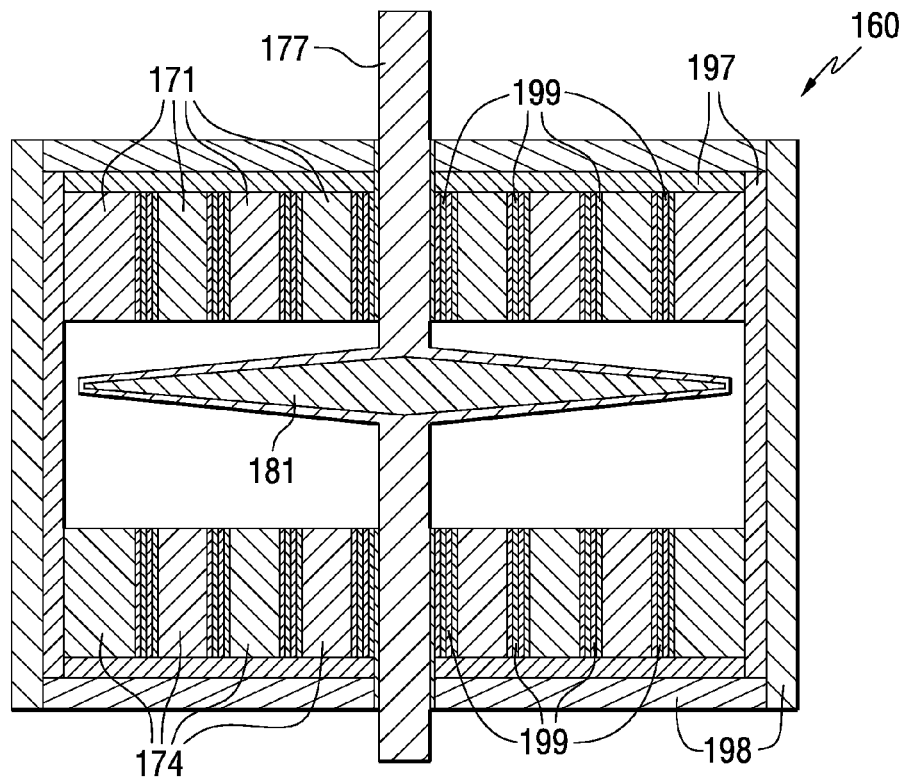
FIG. 15 is a partially schematic side sectional view illustrating an electromagnetic opposing field actuator comprising multiple stationary electromagnetic coils and a movable permanent magnet in accordance with another embodiment of the present invention.

FIG. 15 illustrates an electromagnetic opposing field actuator 160 comprising a housing 161 having an inner ferromagnetic layer 197 (e.g., silicon iron) and an outer non-ferromagnetic shell (e.g., a graphite epoxy composite shell) 198, multiple stationary electromagnetic coils 171, 174 interleaved by ferromagnetic cores (e.g., silicon iron) 199, a shaft 177, and a movable permanent magnet 171 in accordance with another embodiment of the present invention.

FIG. 15 shows multiple concentric coils 171, 174 interleaved by ferromagnetic cores (e.g., silicon iron) 199. Having silicon iron or other types of ferrous cores interleaved in the electromagnetic coils 171, 174 is not an absolute requirement for this type of actuator, nor is having multiple coils. Coils without cores can work as well and may be preferred in some situations. The coils are driven in such a way as to create opposing fields within the actuation space. The housing 161 may comprise a composite comprising an inner ferromagnetic layer 197 supported by an outer non-ferromagnetic shell (e.g., a graphite epoxy composite shell) 198. This type of composite housing construction can be used for either type of actuator, moving coil or moving magnet, to reduce the overall weight of the actuator. The moving element of the actuator may comprise a permanent magnet (e.g., NdFeB 48MGOe) having a biconic shape surrounded and supported by a non-ferromagnetic material (e.g., a fiberglass or carbon fiber reinforced epoxy shell) which is bonded to a shaft 177 that is movable and composed of a non-ferromagnetic material.

An advantage of this type of actuator 160 is that there are no moving electrical connections. However, care must be taken to insure that the moving permanent magnet 181 does not come close to and/or in contact with any ferrous elements in the housing 161 or the coil assemblies 171, 174 at the extremes of its travel. If this happens, the actuator's 160 force curve can become nonlinear near the ends of its travel and the actuator 177 may tend to latch in place. To prevent this, the non-ferromagnetic support structure 199 supporting the magnet may be made thick enough to keep the permanent magnet 181 away from the ferrous elements in the housing 161. Also, making the magnet 171 in the shape of a bicone with the outer diameter tapering to a narrow edge reduces the nonlinear effects of the magnet approaching the ferrous elements 199 in the coil structure 171, 174, and lowers the weight of the moving element 177 without a significant impact on the force per amp of drive current. Having coils 171, 174 without cores can eliminate this non-linearity or latching issue completely.

A potential disadvantage to this type of actuator 160 design is that permanent focus magnets like the ones used in the moving coil version may not be used to linearize the force versus travel curve because the field polarity within the actuation space reverses when the actuator force polarity is reversed. Accordingly, electromagnetic focus elements that can be switched in polarity must be used in the moving magnet case.

For actuators that require very high forces over a small actuation distance with a wide frequency range, this type of actuator 160 may be used because the coils 171, 174 can be sized to create high field intensities without adversely effecting the frequency response due to the added moving mass associated with large coils. Non-limiting examples of applications for this type of device include high power sonar drivers for general underwater exploration or underwater oil exploration. This device 160 is ideally suited for use in highly controllable high-energy underwater sonic wave generation.

Figure 16:
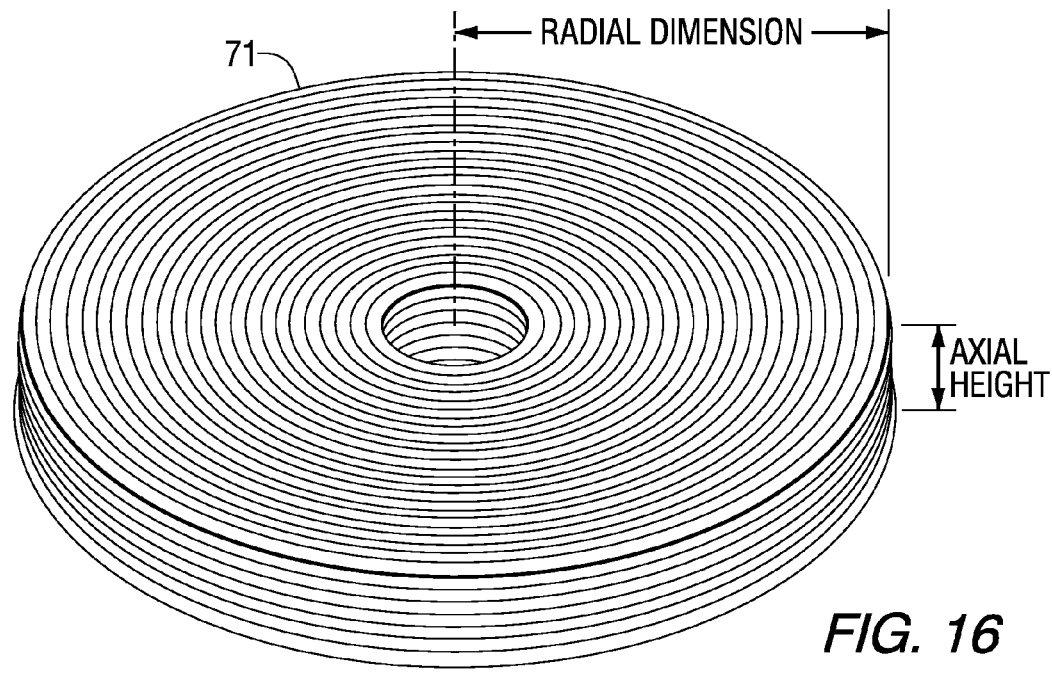
FIG. 16 is a partially schematic isometric view of a single electromagnetic coil.
Figure 17:
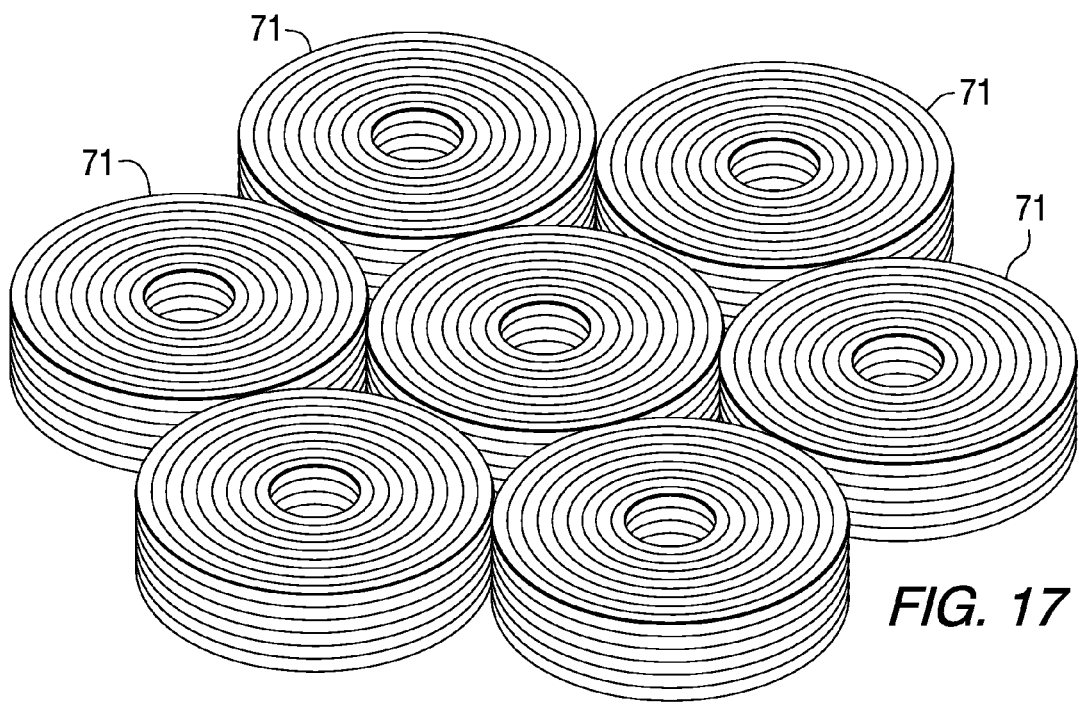
FIG. 17 is a partially schematic isometric view of a multi-coil assembly comprising a plurality of electromagnetic coils.

FIG. 16 illustrates a single electromagnetic coil, and FIG. 17 illustrates a multi-coil assembly comprising a plurality of electromagnetic coils. The electromagnetic coil arrangements shown in FIGS. 16 and 17 may be used in the electromagnetic opposing field actuators in accordance with embodiments of the present invention.

For example, in high frequency applications with stationary permanent magnets, winding the coil or coils with copper plated aluminum can raise the resonant frequency of the moving element and speed up the mechanical response time of the device by reducing the mass of the coil, but would come at the cost of increasing the resistive losses in the coil, and reducing the overall drive capabilities due to the higher resistivity of aluminum.

As the diameter of the linear version of this actuator and its drive coils increase the force increases as well. However, as seen in FIG. 16, the length of wire in each turn in the coil 71 increases as the diameter of the coil increases. This causes a proportionate increase in the Ohmic loss per turn for the outer turns on the coil which lowers the overall efficiency of the device. Accordingly, one method of increasing the efficiency of larger diameter actuators is to construct the moving drive coils as an array of multiple smaller coils 71 as shown in FIG. 17. Similarly the efficiency of the moving permanent magnet versions of this device can be enhanced with a multiple stationary coil array as depicted in FIG. 17. This has the effect of increasing the number of coil turns for a given actuator size and reducing the wire length of each turn, thus lowering the overall Ohmic loss. Raising the turn count for a given actuator volume also increases the force for a given actuator drive current over that of a single coil. It has the added effect of reducing the mass of the coil assembly slightly and thus improving the frequency response of the moving coil embodiment of the actuator. Further optimization can be made to the moving coil version by varying the shape of the coil and the field magnets, the number of turns and the gauge of the wire within the coil, and the balance between the field and focus magnets. This allows the device to be adjusted to enhance particular properties. Properties that can be varied are drive voltage and current, frequency response, force produced for a given electrical power input (Newton/Watt), stroke length, and the shape or flatness of the force produced over the length of the actuation stroke. Many of these properties are interactive and tradeoffs must be made.

Figure 18:
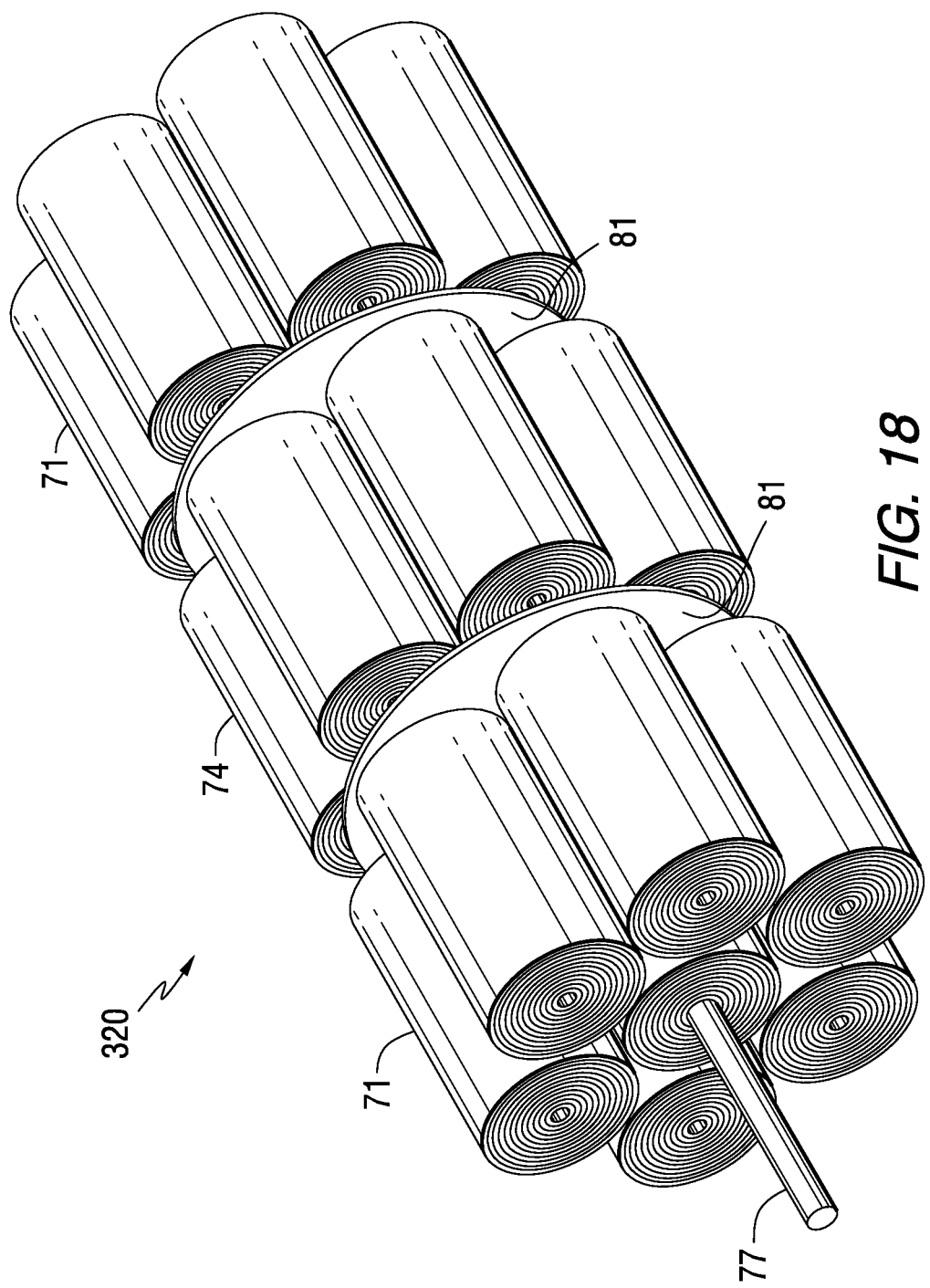
FIG. 18 is a partially schematic isometric view illustrating the relative positions of stationary multi-coil assemblies, movable permanent magnets, and a shaft in a stacked multistage actuator assembly comprising a plurality of electromagnetic field actuators arranged in a series configuration.

FIG. 18 illustrates the relative positions of stationary multi-coil assemblies 71, 74 of FIG. 17, movable permanent magnets 81, and a shaft 77 in a stacked multistage (i.e., 2-stage) actuator assembly comprising a plurality of electromagnetic field actuators mechanically arranged in a series configuration, in the absence of the housing 61, for illustration purposes.

FIG. 18 shows a dual moving permanent biconic magnet 81, connected to a shaft 77, with multi-coil assemblies 71, 74, with no ferrite cores in the field coils. This device 320 is designed to have a magnetic 416 stainless steel housing 61 surrounding the entire device 320.

The following examples are intended to illustrate various aspects of the present invention, and is not intended to limit the scope of the invention.

Example 1

Example Device A, was constructed using a 416 stainless steel main housing with outer diameter of 1.5 inches, total housing length of 1.622 inches, and a wall thickness of 0.12 inches. This device was constructed with two cylindrical field magnets made from NdFeB 1.2 inches in diameter and 0.390 inches thick with a 0.24 inch diameter hole in the center, magnetized through the thickness to 44MGOe. The field magnets are mounted within the housing with a working gap of 0.620 inches between the inward facing opposing poles. Within the ID of the housing, there is a recess cut into the wall of the housing for a ring formed by 8 curved focus magnet segments which are 0.040 inches thick and 0.310 inches high. The center of this recess is located at the center of the working gap of the field magnets. The focus magnets are mounted within the housing such that their inward facing surfaces are flush with the adjacent inside diameter of the housing. The focus magnets are made from NdFeB segments and magnetized through the thickness to 44MGOe. These segments are assembled to form a ring magnet that is magnetized through its diameter with one pole facing the center of the ring and the other pole facing radially outside the ring. The field magnets and the focus magnets are mounted in such a way that the inward facing poles of the focus magnet segments are attracted to the two opposing poles of the field magnets and the focus magnets essentially form a ring magnet that is polarized radially with one pole at the center of the ring. The drive coil is a single spiral wound coil 0.185 inches high with an OD of 1.174 inches and an ID of 0.195 inches, and is wound with approximately 250 turns of 25AWG (American Wire Gage) insulated copper magnet wire. This coil is epoxied to the center of a 4 inch long piece of carbon fiber composite tube with an OD of 0.180 inches and an ID of 0.110 inches. The wires to the coil are run into the center of the tube and both exit at the same end of the tube. The finished device has a bidirectional working travel slightly greater than one centimeter.

Figure 19:
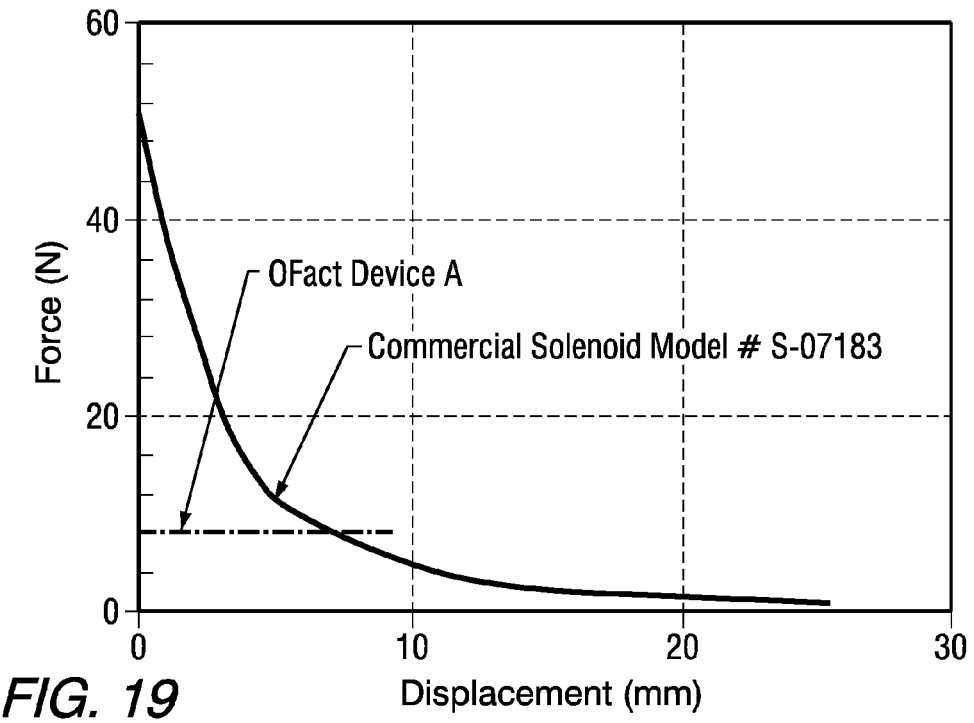
FIG. 19 is a graph illustrating a substantially uniform force across displacement distance exhibited by an electromagnetic opposing field actuator of the present invention compared with a non-uniform force across displacement distance exhibited by a conventional solenoid.

FIG. 19 is a graph illustrating a uniform force across displacement distance exhibited by the electromagnetic opposing field actuator (Device A) of Example 1 comprising a housing, two stationary permanent magnets, a shaft, a movable electromagnetic coil, and a magnetic field tuning element in accordance with an embodiment of the present invention compared with a non-uniform force across displacement distance exhibited by a far larger conventional solenoid.

In addition to contrasting the present invention with prior art devices in the patent literature it is also valuable to compare it with existing state of the art commercial devices. The commercially available device selected for this comparison with Example Device A was the tubular (cylindrical) solenoid model number S-07183 made by Magnet-Schulz of America. This is a typical conventional single action (push or pull) type solenoid with the same continuous duty force at the same stroke as Device A. The following properties and performance data show the spatial, weight and energy efficiency gains. The commercially available solenoid produced a continuous duty force of 8N with the core extended 7 mm compared to the present invention which creates a continuous duty force of 8N across the entire displacement range of 10 mm. The difference in force versus displacement for the two devices is plotted in FIG. 19. Both were powered at 10 W. The solenoid weight is 0.422 kg, Device A actuator weight is 0.295 kg, solenoid length 6.12 cm, Device A length 4.1 cm, solenoid diameter 3.8 cm, Device A diameter 3.8 cm, solenoid volume 69.4 cubic centimeters, Device A volume 46.5 cubic centimeters. Moreover, the commercial solenoid would have to be configured as two opposing solenoids in order to produce controlled bidirectional action which would double the solenoid weight and volume. This comparison illustrates how the arrangement of the current invention gives it a higher force to volume ratio and higher operating efficiency because it is less sensitive to losses in the magnetic field gap and the magnetic field return circuit.

Figure 20:
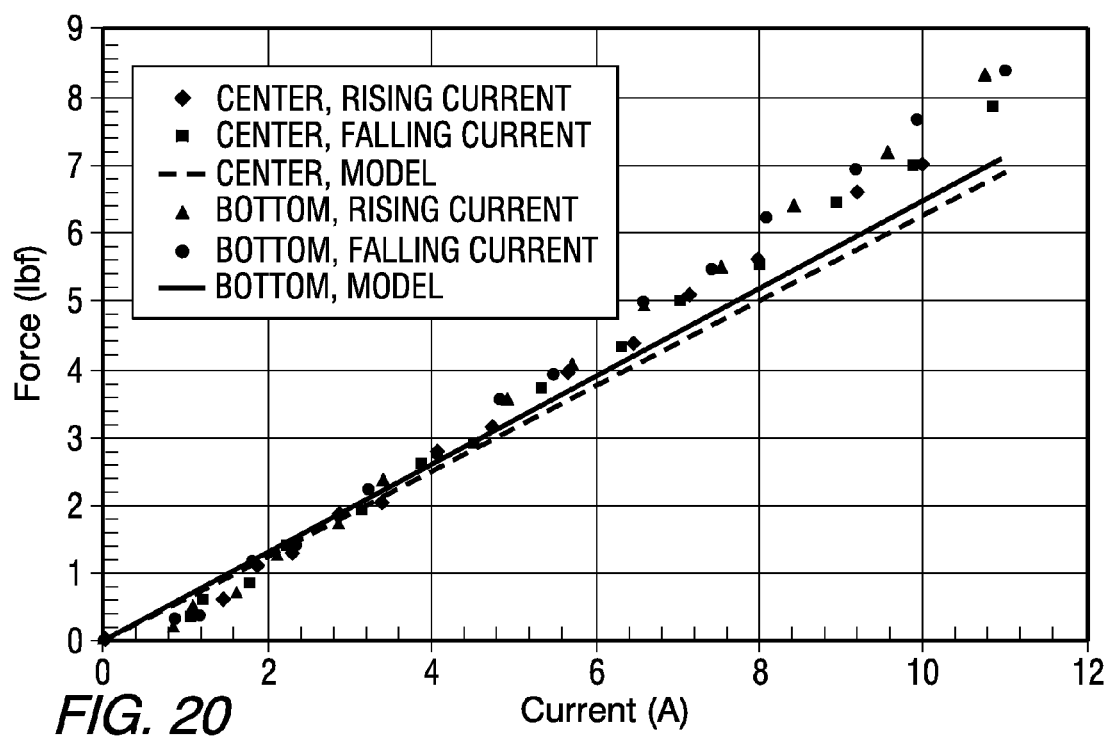
FIG. 20 is a graph illustrating a predicted linearly proportional force to an applied current as determined by magnetic modeling software and analysis as compared with an actual measured linearly proportional force to an applied current exhibited by an electromagnetic opposing field actuator of the present invention.

FIG. 20 is a graph illustrating a predicted linearly proportional force to an applied current (dashed lines) as determined by magnetic modeling software and analysis as compared to an actual measured linearly proportional force to an applied current exhibited by the electromagnetic opposing field actuator of Example 1 comprising a housing, two stationary permanent magnets, a shaft, a movable electromagnetic coil, and a magnetic field tuning element in accordance with an embodiment of the present invention.

This device was modeled with finite element magnetic modeling software and subsequently tested statically and dynamically in a force measurement rig to validate the model results. FIG. 20 shows the results of DC power testing and model result comparisons. The bottom and center references in the chart refer to the position of the coil within the housing and show the linearity of the performance of the actuator across the range of motion.

Figure 21:
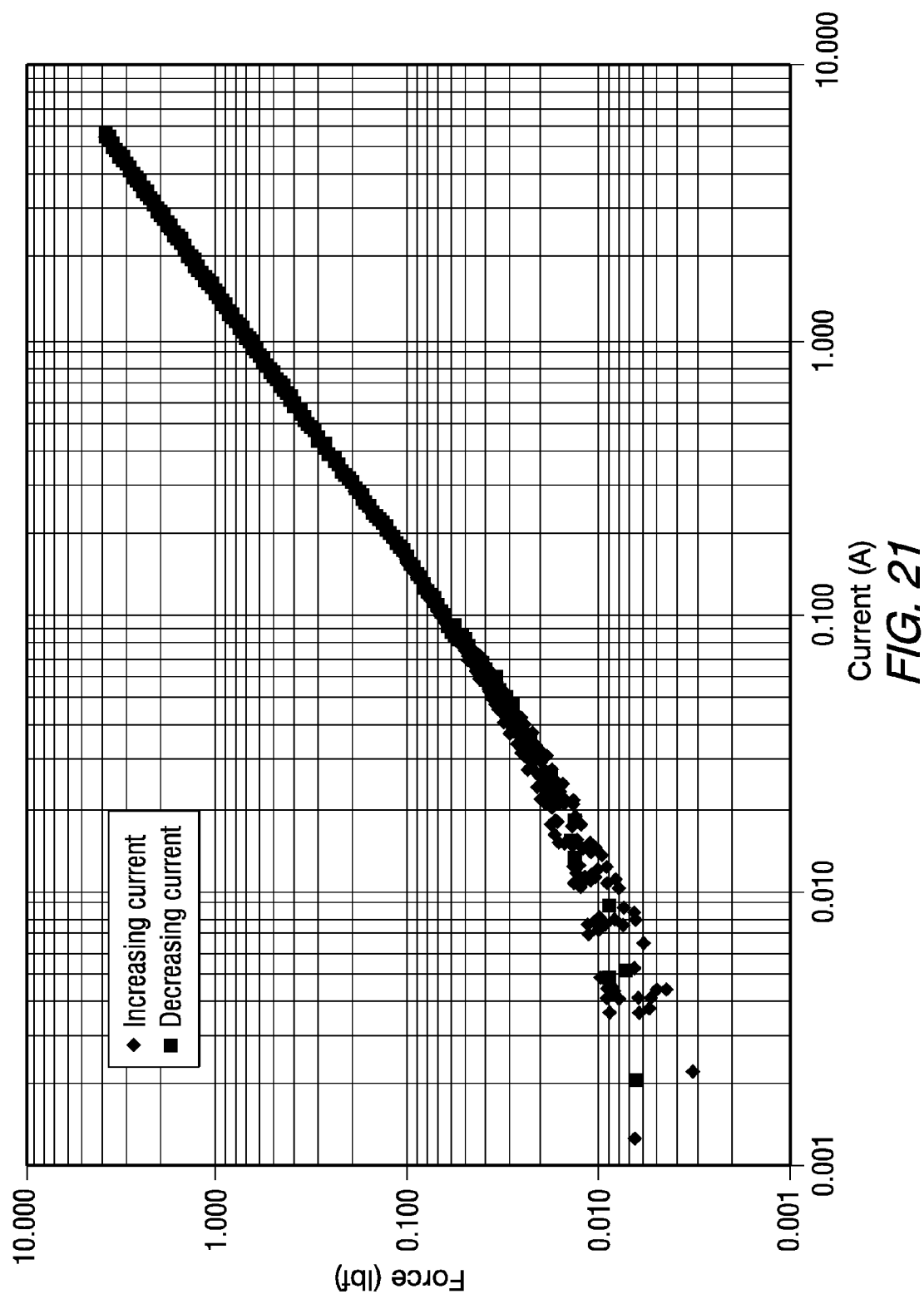
FIG. 21 is a graph illustrating a resolution range of measured force to an applied current exhibited by an electromagnetic opposing field actuator of present invention.

FIG. 21 is a graph illustrating a resolution range of an actual measured force to an applied current exhibited by the electromagnetic opposing field actuator of Example 1 comprising a housing, two stationary permanent magnets, a shaft, a movable electromagnetic coil, and a magnetic field tuning element in accordance with an embodiment of the present invention.

FIG. 21 shows the measured force resolution range. The scatter in the data at the lower force levels is associated with the limited sensitivity of the 10 lb and 100 lb load cells (force gauges) used. Higher force resolution is anticipated with force sensors designed specifically to resolve forces at the lower end of the force range.

Figure 22:
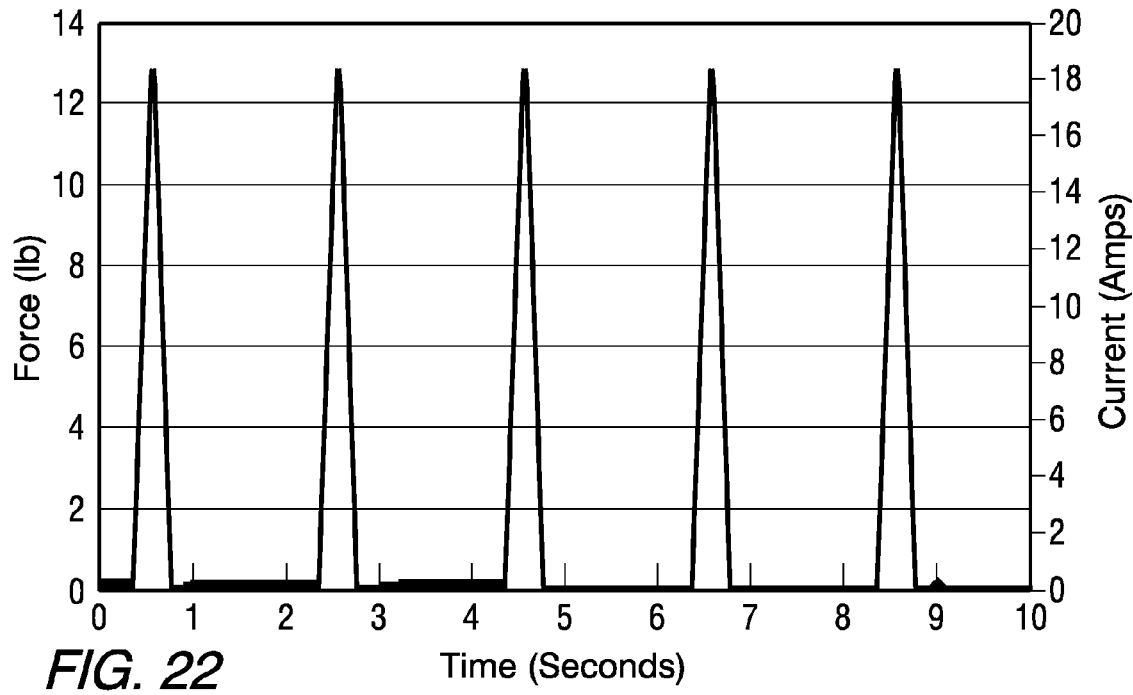
FIG. 22 is a graph illustrating force and current impulse response over time from a simulated robotic application.

FIG. 22 is a graph of measured force and current impulse response over time from the electromagnetic opposing field actuator of Example 1 for a simulated robotic application.

Example Device A also has a continuous linear force output rating of up to 8N and an impulse rating of 55N (<150 ms pulse repeated at >2 second intervals) with a frequency response of 150 Hz.

In the application the momentum imparted to a movable component by the initial impulse is exploited for free swinging motion until the next impulse is released. Alternatively, it can be run with different current profiles versus distance to generate various spring rates or arbitrary force versus distance profiles to meet a given application. This is useful for robotic applications where an actuator may need to provide give or push back to accommodate the mechanical properties of an external body with which it has to interact. This type of soft or compliant actuation can prevent damage to objects being handled and actively control forces to improve human to machine physical interaction. The property of soft compliant interaction also makes present invention ideal for haptic or touch feedback applications wherein the device provides tactile feedback to a human operator controlling a remote robotic device.

The device also provides a high reliability failsafe mode, going limp when power is removed. This limp mode also provides an opportunity for efficient operation of locomotive or walking robotic devices by allowing the actuators to achieve a smooth transition from active force application (typically high force impulse when initiating motion) to force-free conservation of momentum and back again without complicated mechanisms or control systems.

Figure 23:
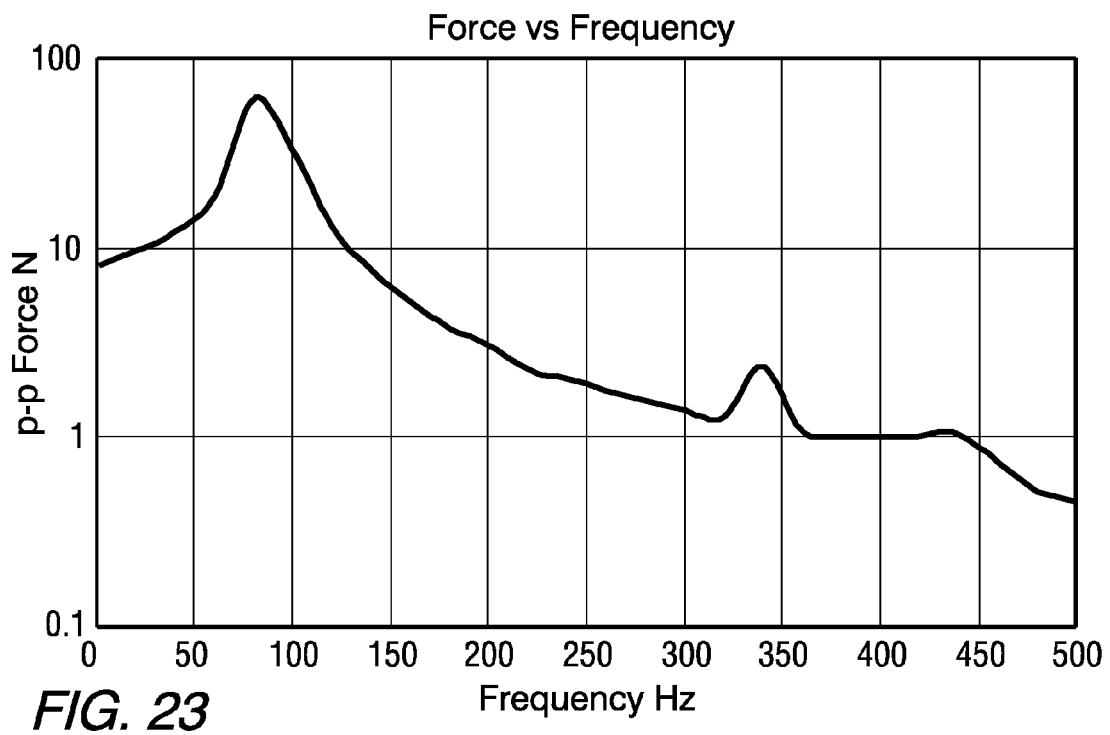
FIG. 23 is a graph illustrating frequency response of an electromagnetic opposing field actuator of the present invention when driven with a constant electrical drive using a spring as a mechanical load.

FIG. 23 is a graph illustrating frequency response of the electromagnetic opposing field actuator of Example 1 when driven with a constant electrical drive using a 22 pound inch spring as a mechanical load. Note the single large peak at 90 Hz corresponding to the resonance of the actuator. The second smaller peak at 340 Hz corresponds to the self resonance of the spring. The single clean 90 Hz resonance like this for the actuator reflects the linearity, mechanical simplicity, and stability of the actuator. The relatively small perturbation caused by the spring resonance demonstrates that this particular actuator will continue to deliver useful output over a wide frequency range.

Example 2

Example Device B was constructed with different dimensions from Example Device A. Example Device B weighed 2.1 kg, measuring 7.2 cm long, 7.6 cm diameter, generating a bidirectional symmetrical working stroke of 1 cm with a continuous linear force output rating up to 130N and an impulse rating of 900N (<150 ms pulse repeated at >2 second intervals) with a frequency response of 100 Hz.

Example 3

A family of seven devices are designed and modeled based on a 3 inch outside diameter housing for a device similar to the device shown in FIG. 3 with actuation ranges of 2 mm to 5 cm to demonstrate the range of actuation parameters obtainable within a limited design envelope. For this example the size and power of the field magnets as well as the size, number of turns, and power applied to the coil are all held constant. The thickness of the housing is held constant to the extent possible while allowing minor variation to accommodate the focus magnets. These devices are designed with a 416 stainless steel housing having an ID of 7 cm (2.75 inch) and a nominal outer diameter of 8.4 cm (3.3 inch) with a typical wall thickness of 7 mm (0.275 inch). The length of the housing is varied to accommodate the actuation distance as required, and the outer diameter increases slightly in the cases with longer actuation distance to accommodate the focus magnets. This device is constructed with two cylindrical field magnets made from NdFeB 6.6 cm (2.59 inch) in diameter and 2 cm (0.787 inch) thick with a 4 mm (0.157 inch) diameter hole in the center, magnetized through the thickness to 48MGOe. The field magnets are mounted within the housing with a working gap which is the actuation distance plus 8 mm (0.315 inch) between the inward facing opposing poles. A recess is cut into the inward facing wall of the housing at a height corresponding to the center of the working gap of the field magnets. A ring of curved focus magnet segments is mounted in the recess and their size and position are varied depending on the linearization requirements of each device modeled. The focus magnets are made from NdFeB segments assembled in-situ to form a ring shaped assembly. Each focus magnet segment is magnetized through the thickness to 48MGOe in order to form a ring magnet that is magnetized through the diameter of the ring, thereby creating a magnetic ring with one pole facing the center of the ring and the other pole pointing radially outward. The field magnets and the focus magnets are all mounted such that the inward facing pole of the focus magnets are attracted to the two opposing poles of the field magnets. The drive coil is a single spiral wound coil 6 mm (0.236 inch) high with an OD of 6.4 cm (2.52 inch) and an ID of 6 mm (0.236 inch) diameter, and is wound with 692 turns of 24AWG insulated copper magnet wire. The coil is coated with a carbon fiber composite layer 1 mm (0.039 inch) thick for structural reinforcement making the total coil height 8 mm (0.315 inch) and increasing the diameter of the coil to 6.6 cm (2.59 inch). The coil is attached to a shaft of carbon composite 6 mm (0.236 inch) in diameter and long enough to penetrate the housing with sufficient external length to be in communication with an external load.

Figure 24:
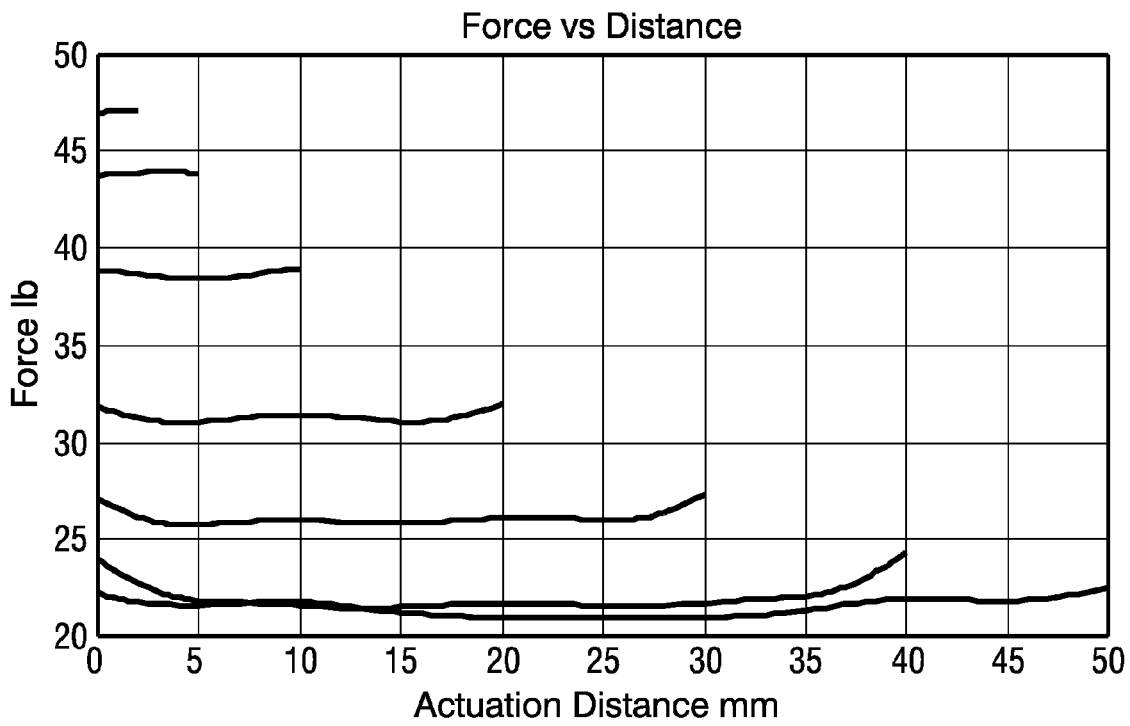
FIG. 24 is a graph illustrating a substantially uniform force across displacement distance exhibited by a family of electromagnetic opposing field actuators, having increasing maximum displacement in accordance with embodiments of the present invention.

FIG. 24 is a graph illustrating a uniform force across displacement distance exhibited by a family of electromagnetic opposing field actuators, having increasing maximum displacement of Example 3. FIG. 24 shows the force over distance plot for each actuator modeled. While this illustrates a range of obtainable performance within the above described set of constraints it is also possible to create devices with smaller or larger actuation distances. Similarly, opening up the design envelope to allow different total actuator mass and dimensions, coil configurations, etc., permits a far greater range of performance parameters to be obtained.

Figure 25:
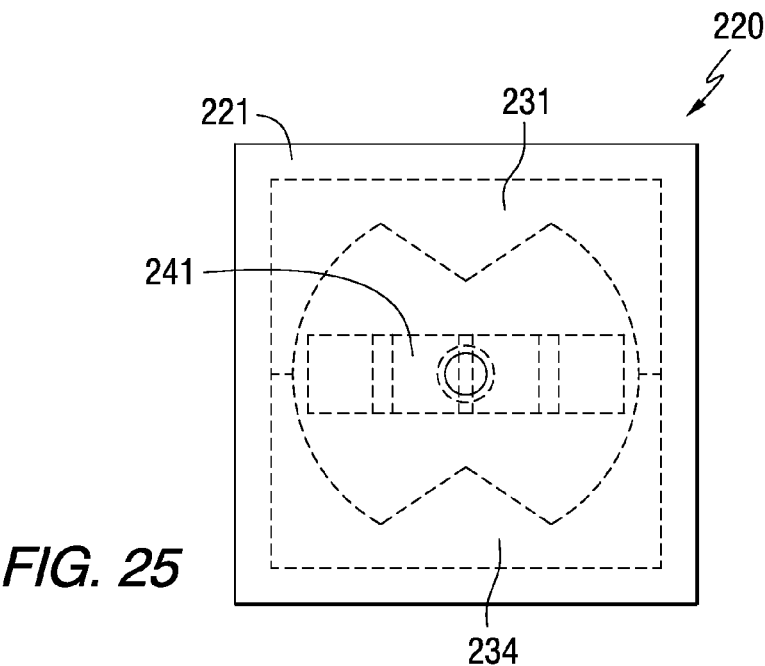
FIG. 25 is a partially schematic top view of a rotary electromagnetic opposing field actuator comprising two stationary permanent magnets and a rotatable electromagnetic coil assembly in accordance with another embodiment of the present invention.

FIG. 25 is a schematic cross-sectional view illustrating a rotary electromagnetic opposing field actuator 220 comprising a housing 221, two stationary permanent magnets 231, 234, a shaft 237, and a tilting or rotating electromagnetic coil assembly 241 in accordance with another embodiment of the present invention.

Figure 26:
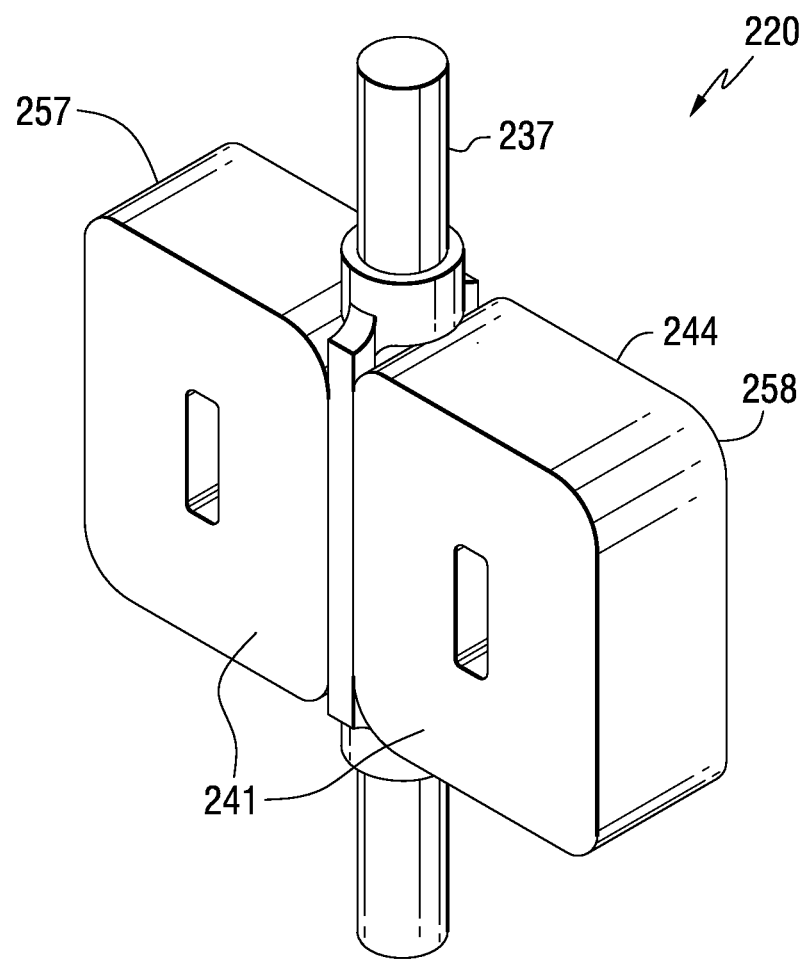
FIG. 26 is a partially schematic isometric view illustrating the relative positions of a shaft and the rotatable electromagnetic coil assembly of the rotary electromagnetic opposing field actuator of FIG. 25.

FIG. 26 is a top partial isometric view illustrating the relative positions of the shaft 237 and the rotatable electromagnetic coil assembly 241 for the rotary electromagnetic opposing field actuator 220 of FIG. 25, in the absence of the housing 221 and the two stationary permanent magnets 231, 234 for illustration purposes.

The device 220 shown in FIGS. 25 and 26 produces limited rotary motion in place of linear actuation. This is achieved with a tilting coil assembly 241 comprising two coils 257, 258 with each one on either side of a pivot point at the center of a cancellation field created by two opposing field magnets 231, 234 that are held in contact with each other by a moderate-permeability housing 221. This embodiment uses the same operating principle as the linear device except that there are two coils 257, 258 that are driven so that they create forces in opposite directions. The two stationary permanent field magnets 231, 234 have a large gap that provides the space for the coil assembly 241 to rotate up to ±45 degrees from center. The force of the actuator 220 over the rotation arc can be made linear by controlling the shape, size and internal dimensions of the two stationary permanent field magnets 231, 234. Conversely, if a non linear force profile is required, it can be achieved by controlling the internal shape of the two stationary permanent field magnets 231, 234. FIG. 26 shows the details of the rotary coil assembly 241. The two opposing drive coils 257, 258 are connected to a drive shaft assembly 237.

The materials, processes and examples described herein are for illustrative purposes only and are therefore not intended to be limiting, unless otherwise specified. Where a closed or open-ended numerical range is described herein, all numbers, values, amounts, percentages, subranges and fractions within or encompassed by the numerical range are to be considered as being specifically included in and belonging to the original disclosure of this invention as if these numbers, values, amounts, percentages, subranges and fractions had been explicitly written out in their entirety.

Whereas particular embodiments of this invention have been described above for purposes of illustration, it will be evident to those skilled in the art that numerous variations of the details of the present invention may be made without departing from the invention as defined in the appended claims.

What is claimed is:

1. An electromagnetic actuator capable of generating a symmetrical bidirectional force comprising:
a housing comprising a ferromagnetic material, wherein the housing has a first end wall, a second end wall opposite the first end wall, and a side wall interconnecting the first and second end walls;
a first captive permanent magnet arranged on the first end wall and having an inward facing pole;
a second captive permanent magnet arranged on the second end wall and having an inward facing pole arranged to repel the inward facing pole of the first permanent magnet causing the first and second permanent magnets to have opposing magnetic fields;
a shaft comprising a magnetically inert material, wherein the shaft is movable along a longitudinal axis extending between the first and second end walls, and comprises a central portion interposed between the first and second permanent magnets; and
an electromagnetic coil arranged on the central portion of the shaft, wherein the electromagnetic coil is capable of generating a force when energized that causes linear displacement of the shaft in either direction along the longitudinal axis depending on a direction of current through the electromagnetic coil.

2. The electromagnetic actuator according to claim 1, wherein
the housing defines a central cavity;
the first permanent magnet is arranged on an inner surface of the first end wall, and wherein a first zone comprising a non-ferromagnetic material is interposed between an outer side surface of the first permanent magnet and an inner surface of the side wall;
the second permanent magnet is arranged on an inner surface of the second end wall, and wherein a second zone comprising a non-ferromagnetic material is interposed between an outer side surface of the second permanent magnet and the inner surface of the side wall;
the central portion of the shaft is arranged in the central cavity of the housing; and
an air gap is interposed between an outer surface of the electromagnetic coil and the inner surface of the side wall.

3. The electromagnetic actuator according to claim 2, wherein
the first zone comprises a first air gap, and the second zone comprises a second air gap.

4. The electromagnetic actuator according to claim 2, wherein
the shaft is central to and parallel with the side wall, and perpendicular to the first and second end walls.

5. The electromagnetic actuator according to claim 1, wherein
the first end wall has a first central opening, and the second end wall has a second central opening;
the first permanent magnet has a first central hole;
the second permanent magnet has a second central hole; and
the shaft has a first end portion extending through the first central hole and the first central opening, and a second end portion extending through the second central hole and the second central opening.

6. The electromagnetic actuator according to claim 1, wherein the ferromagnetic material comprises a soft ferromagnetic material having a relative permeability of at least 750$\mu_r$.

7. The electromagnetic actuator according to claim 1, wherein the ferromagnetic material comprises 400 series stainless steel, 416 stainless steel, mild steel, soft iron, an iron-silicon alloy, an iron-cobalt-vanadium alloy, or a combination thereof.

8. The electromagnetic actuator according to claim 1, wherein the first permanent magnet and/or the second permanent magnet comprise an assembly of permanent magnets.

9. The electromagnetic actuator according to claim 1, wherein the first permanent magnet and the second permanent magnet comprise a permanent magnet or an assembly of permanent magnets having a maximum energy product (BH$_{max}$) of greater than 16 megaGauss-Oersteds.

10. The electromagnetic actuator according to claim 1, wherein the first permanent magnet and the second permanent magnet comprise a neodymium-iron-boron magnet, an assembly of neodymium-iron-boron magnets, a samarium-cobalt alloy magnet, an assembly of samarium-cobalt alloy magnets, or a combination thereof.

11. The electromagnetic actuator according to claim 1, wherein the magnetically inert material comprises fiber reinforced resin, fiber reinforced epoxy resin, fiberglass reinforced resin, fiberglass reinforced epoxy resin, carbon fiber reinforced resin, carbon fiber reinforced epoxy resin, aramid fiber reinforced resin, aramid fiber reinforced epoxy resin, or a combination thereof.

12. The electromagnetic actuator according to claim 1, wherein the electromagnetic coil comprises a multi-coil assembly of electromagnetic coils.

13. The electromagnetic actuator according to claim 1, wherein the electromagnetic coil has increasing numbers of wire turns with increasing distance from the longitudinal axis.

14. The electromagnetic actuator according to claim 1, wherein the electromagnetic coil comprises an insulated conductive wire, an insulated copper magnet wire, an insulated aluminum wire, an insulated copper-coated aluminum wire, or a combination thereof.

15. The electromagnetic actuator according to claim 1, further comprising a magnetic field tuning element comprising a permanent magnet or an assembly of permanent magnets located on or in the side wall.

16. The electromagnetic actuator according to claim 15, wherein the permanent magnet and/or or the assembly of permanent magnets of the magnetic field focusing element comprises a neodymium-iron-boron magnet, an assembly of neodymium-iron-boron magnets, a samarium-cobalt alloy magnet, an assembly of samarium-cobalt alloy magnets, or a combination thereof.

17. The electromagnetic actuator according to claim 1, further comprising a magnetic field focusing element comprising an assembly of permanent magnets circumferentially positioned on or in the side wall to form a ring magnet that is polarized in a radial direction perpendicular to the longitudinal axis.

18. The electromagnetic actuator according to claim 1, wherein a core of an axial cancellation field comprising a substantially reduced magnetic field and a substantially reduced flux density extends along the longitudinal axis between the first and second permanent magnets having opposing magnetic fields.

19. The electromagnetic actuator according to claim 1, wherein a core of a radial cancellation field comprising a substantially reduced magnetic field and a substantially reduced flux density extends from the central portion of the shaft in a plane perpendicular to the longitudinal axis.

20. The electromagnetic actuator according to claim 1, wherein a substantially constant force that is linearly proportional to a drive current is generated over at least 90 percent of an actuation distance of the bidirectional linear displacement of the shaft along the longitudinal axis.

21. The electromagnetic actuator according to claim 20, wherein the substantially constant force is generated at opposite ends of travel of the electromagnetic coil.

22. The electromagnetic actuator according to claim 1, which exhibits a substantially uniform force at all displacement distances within an actuation range between the first and second permanent magnets in the absence of latching forces.

23. The electromagnetic actuator according to claim 1, wherein the actuator generates linear and bidirectional movement or force in the absence of an elastic element, a mechanical return element, or a spring.

* * * * *